United States Patent [19]

Meister

[11] Patent Number: 5,656,708
[45] Date of Patent: *Aug. 12, 1997

[54] PROCESS FOR MAKING GRAFT COPOLYMERS FROM LIGNITE AND VINYL MONOMERS

[76] Inventor: John J. Meister, 31675 Westlady Rd., Beverly Hills, Mich. 48025-3744

[*] Notice: The term of this patent shall not extend beyond the expiration date of Pat. No. 5,331,088.

[21] Appl. No.: 461,956

[22] Filed: Jun. 5, 1995

[51] Int. Cl.$^6$ .................................................. C08H 5/02
[52] U.S. Cl. .......................... 527/400; 530/203; 527/500
[58] Field of Search ........................... 530/203; 527/400, 527/500

[56] References Cited

U.S. PATENT DOCUMENTS

| | | | |
|---|---|---|---|
| 4,676,317 | 6/1987 | Fry et al. | 166/293 |
| 4,687,828 | 8/1987 | Meister et al. | 527/400 |
| 4,703,801 | 11/1987 | Fry et al. | 166/293 |
| 4,889,902 | 12/1989 | Meister | 527/400 |
| 4,931,527 | 6/1990 | Meister | 527/400 |
| 4,938,803 | 7/1990 | Huddleston et al. | 106/719 |
| 4,940,764 | 7/1990 | Meister | 527/400 |
| 5,028,271 | 7/1991 | Huddleston et al. | 106/720 |
| 5,331,088 | 7/1994 | Meister | 530/203 |

OTHER PUBLICATIONS

A. L. McClellan, "Tables of Experimental Dipole Moments", pp. 35, 59, and 79, W.H. Freeman and Company, San Francisco, CA, (1963).

J. Bandrup and E.H. Immergut, "Polymer Handbook", pp. III/1–III/11, Third Edition, Wiley Interscience, NY, (1989).

Van Nostrand's "Scientific Encyclopedia", 5th Edition, (1976).

George Odian, "Principles of Polymerization", 2d ed., John Wiley & Sons, New York, 1981, pp. 194–198, 679.

*Primary Examiner*—Samual A. Acquah
*Attorney, Agent, or Firm*—Barnes, Kisselle, Raisch, Choate, Whittemore & Hulbert P.C.

[57] ABSTRACT

A process for making a water-insoluble, graft copolymer of lignite-(ethene or substituted ethene monomer) having a central lignite network and at least one grafted side chain, R, having "m" repeating units of (1-phenylethylene), 1-methyl-1-(1-oxo-2-oxypropyl)ethylene, a polymerized 2-methyl-3-oxo-4-oxybut-1-ene-(p-ethoxy-(3*p+3)-ol), or any other substituted ethene monomer which has a dipole moment of less than 1.2 or a water solubility of less than 5 g/100 g water at 30° C. The ethene monomer forms the sidechain by free radical polymerization and, in the sidechain, m and p vary from 1 to 300,000 such that the central lignite network has a molecular weight of about 1,000 to 1,500,000; the total number of random units in a grafted side chain is in the range of 1 to 300,000 units; and the total number of sidechains attached to lignite, x, is in the range of 1 to 500; such that the total copolymer molecular weight is in the range of 1,500 to 30,000,000. This process makes a material which is a hard, strong, thermoplastic that can be molded, cast, and extruded into parts, equipment, and consumer items.

40 Claims, No Drawings

PROCESS FOR MAKING GRAFT COPOLYMERS FROM LIGNITE AND VINYL MONOMERS

FIELD OF THE INVENTION

The present invention relates to a process for making graft copolymers of lignite by attaching to the lignite a sidechain of polymerized ethene monomer.

BACKGROUND

In 1988, the United States produced a larger volume of polymers and plastics than the entire annual production volume of steel, aluminum, and copper combined. Polymers have become the most common material in our daily lives and are critical items of commerce, industry, and technology. Aqueous solutions which flow at a controlled rate under a given shear stress are also required throughout a variety of industrial applications. Simultaneously, there is enormous need for materials that are ductile at room temperature and can be molded into articles of manufacture or complex shapes. This invention will disclose a unique class of materials that are useful in both applications.

The control of viscosity of water is achieved by adding to water agents such as clays, amounts of polar organic compounds such as polyacrylates, or high concentrations of salts. With the appropriate additives, these aqueous solutions can suspend large amounts of a solid phase and form a thermodynamically stable mixture. These aqueous solutions suspend finely divided solids and will flow slowly when exposed to shear stress. Such solutions, free of solids, also flow more uniformly in situations where numerous paths providing different resistances to flow are open to the fluids.

When a solid must be formed, the materials used to control fluid flow are, generally, not considered. This is because the fluid flow agents form brittle or hydroscopic solids that decompose instead of becoming extrudable when heated. Since materials that can be reformed into articles of manufacture just by heating and plastic processing are very desirable, a large class of compounds which exhibit this behavior have been invented.

However, each of the conventional agents for flow control or solid formation has attendant disadvantages. Hence, a need continues to exist for new agents which are capable of suitably thickening water and aqueous solutions or making objects of manufacture with functional strength and resistance properties. Further, most of the polymeric compounds used in flow control or article manufacture are made from expensive, petrochemical-derived, synthetic chemicals rather than cheaper natural compounds like lignite.

Lignites are a class of materials often used as fuel. The materials are "short" internment, fossil fuels that would eventually; under the actions of time, pressure, microorganisms, water, and geologic process; become hard coals, bituminous or anthracite. Lignites, also called brown coal, thus range from peats, starting with "mature peats" or "immature brown coals", to bituminous coal. The American Society for Testing and Materials has classified coals by heat content with lignites having a moist-basis, heat value below 19.29 MJoules/Kg. This classification is not absolute, however, and other classification procedures, such as those of the International Classification of Hard Coal by Type or the International Classification for Brown Coals for the Peoples Democracies, differ from this specification. Peat generally has large pores with less than 50 percent carbon in vitrinite, details of initial plant material still recognizable, and free cellulose present in the material. Soft brown lignite generally has reduced pores with more than 50 percent carbon in vitrinite, details of initial plant material still recognizable, and little or no cellulose present in the material. There is often from 35 to 75 weight percent water in the material as mined. At the transition between soft brown lignite and dull brown lignite, the cell cavities are frequently empty.

Dull brown lignite generally has minimal pores, details of initial plant material still recognizable, and no free cellulose present in the material. There is often from 25 to 35 weight percent water in the material as mined. The percent reflectance of vitrinite is often 0.3 or above and the percent carbon in vitrinite is 65 percent or more. The volatile matter in dry, ash-free vitrinite is usually between 49 and 53 weight percent and the heat content is between 16.7 and 23.0 MJoules/Kg. As soft brown lignite becomes dull brown lignite or brown coal, marked gelification and compaction takes place.

Bright brown lignite generally has cell cavities filled with collinite, details of initial plant material still partially recognizable, and no free cellulose present in the material. There is often from 10 to 25 weight percent water in the material as mined. The percent reflectance of vitrinite is often 0.4 or above and the percent carbon in vitrinite is 70 percent or more. The volatile matter in dry, ash-free vitrinite is usually between 45 and 49 weight percent and the heat content is between 23.0 and 29.3 MJoules/Kg. The properties listed change gradually as the bright brown lignite/coal becomes bituminous hard coal.

The above descriptions am based on the use of lignite as a fuel. Chemically, lignite is a naturally occurring, organogel deposit formed in the anaerobic decomposition of plants under acidic conditions. The simplest difference between the plant and lignite is one million years of weathering, compaction, and rotting. Table 1 lists some lignite deposits by location and the time since the deposit was laid down. Further data on lignite can be found in "Low-Rank Coal Technology: Lignite and Subbituminous" by G. H. Gronhovd, Noyes Data Corp., Park Ridge, N.J., (1982).

TABLE 1

Location and Age of Some Lignite Deposits.

| Location of the Deposit. | Millions of Years Since Deposition Occurred. | Geologic Period in Which Deposition Occurred. |
| --- | --- | --- |
| New Zealand | One | Pleistocene |
| Tasmania | One | Pleistocene |
| Alaska | Two | Pliocene |
| Southeastern Europe | Two | Pliocene |
| Central Germany | Twenty | Miocene |
| England | Forty | Oligocene |

In the time listed in Table 1 between when the plant died and when humans discovered the deposit of plant atoms, major changes take place in how those atoms are bound together. A list of these changes is given below.

1. The plant biomass compacts as time passes so that the tubules, capillaries, and cell structure that permeate early lignite decrease in diameter and length. With increasing age since deposition, these structures become smaller and the lignite changes from a porous media to a microporous solid to an impermeable solid with increasing age.

2. The elemental composition of the lignite changes with time. Thus, if the elemental analysis of a gram of dry lignite were written $C_vH_wO_xN_yS_z$, then when samples of the lignite were assayed after different amounts of time in the ground, the hydrogen to carbon ratio, w/v, would decrease. Further, the amount of oxygen in the sample, x, would decrease as the millions of years passed. Very crudely, the hydrogen-carbon ratio might change quickly from a modern value of almost 2 to somewhere around 1.2. It then would slowly change from 1.2 toward 0.8 and eventually toward 0.6.

3. As the age of the lignite increases, the fraction of carbon in aromatic structures increases.

4. Simultaneously, the number of aromatic rings fused together into small connected clusters increases from 1 ring toward 4 as the age of the lignite increases. The ring clusters are interconnected by cycloalkyl structures that themselves form 6 member rings.

5. The oxygen in the molecules is in the form of hydroxyl and quinone groups. A structure which contains some of the appropriate functional groups is shown as structure 1. It may be representative of some parts, interconnections, or sections of molecules in lignite.

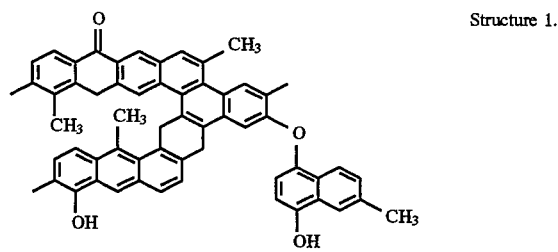

Structure 1.

Structure 1 is only a display of the type of structure for which chemists have seen spectral and chemical identifiers. It should not be taken as the actual structure of the molecules that make up lignite. As noted above, however, it should reflect the structures that are found in parts of lignite. Further data on the structure and composition of lignite can be found in "Chemistry of Lignite Liquefaction", prepared for the U.S. Energy Research and Development Administration by the University of North Dakota under contract #E(49-18)-2211, National Technical Information Service, (1976).

A material is defined to be hydrophobic if it has a dipole moment of less than 1.2 or a water solubility of less than 5 g/100 g water at 30° C.

SUMMARY OF THE INVENTION

Compounds which contain large amounts of lignite are desirable, cheap products because of low raw materials cost. Lignite-containing materials also have a two part structure with the lignite and synthetic parts of the compound tending to phase separate or seek different chemical environments. This difference in affinities produces surface activity which allows the production of very novel thickening agents or plastics. Thickening agents, flow control agents, and thermoplastic solids containing large amounts of lignite are desirable materials because of surface activity, chemical properties, and low materials cost.

Heretofore, no broadly functional methods to graft lignite were known. A method has now been developed which allows ethene monomers to be attached to lignite and lignite polymers and thermoplastics to be made. This invention provides a broad spectrum of soluble or extrudable copolymers and methods for making said copolymers.

The objectives of the present invention include: 1. provide new copolymers containing lignite as the backbone component with a side chain or chains formed from a vinyl monomer; and 2. methods for synthesizing lignite copolymers having vinyl monomer side chain or chains.

Accordingly, it is an object of the present invention to disclose a water-insoluble, thermoplastic graft copolymer of lignite comprising a central lignite network and at least one grafted sidechain, each of the sidechains having at least one repeat unit, M', formed by polymerizing at least one hydrophobic ethene monomer, M. Lignite is meant to specify at least one of peat, soft brown lignite, dull brown lignite, bright brown lignite, and coal. Typical monomers, M, that can be used to add a side chain to lignite are those with the general structure:

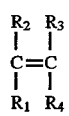

where $R_1$, $R_2$, $R_3$, and $R_4$ are organic or inorganic functional groups which do not interfere with free radical polymerization. Alternatively, the reaction can be run with the above monomers and some amount of a diethene compound,

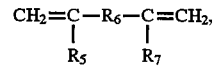

where $R_5$, $R_6$, and $R_7$ are organic or inorganic functional groups which do not interfere with free radical polymerization. The diethene compound will cause crosslinking of grafted molecules during the polymerization and, at low concentrations, will produce a higher molecular weight copolymer. At high concentration of diethene compound, a crosslinked solid will be produced by the reaction. These monomers are reacted with lignite to create a two part molecule such that the central lignite network has a molecular weight of about 1,000 to 1,500,000; the total number of random units in a grafted side chain is in the range of 1 to 300,000 units; and the total number of sidechains attached to lignite, x, is in the range of 1 to 500; such that the total copolymer molecular weight is in the range of 1,500 to 30,000,000.

The substituents on the at least one monomer; $R_i$, where i=1 to 7; are selected from the group of alkanes, alkenes, alkoxides, aromatics, cycloalkanes, esters, and halogens. Representative ethene monomers that can be made by selecting substituents from the listed groups are haloethenes where a haloethene is a monohalide- to tetrahalide- substituted ethene with the halide being fluorine, chlorine, or bromine; 1-phenylethene; 1-methyl-1-phenylethene; 1-(n-halophenyl)ethene where n is 2, 3, or 4 and the halide substituent is fluorine, chlorine, or bromine; 1, n-diethenylbenzene, where n=2, 3, or 4; 1,3-butadiene; 2-methyl-1,3-butadiene; 1-methyl-1-phenylethene; 2-chloro-1,3-butadiene; 2-oxo-3-oxypent-4-ene; a 2-methyl-3-oxo-4-oxybut-1-ene-(p-ethoxy-(3*p+3)-ol) and p varies from 0 to 300,000; 2-oxy-3-oxopent-4-ene; 4-methyl-2-oxy-3-oxopent-4-ene; propene; ethene; alkene-aromatics; alkene ethers, or acrylates. Two or more monomers can be reacted to make the sidechains on lignite that contain several different repeat units. In reactions with monomer mixtures, the mole fraction of one monomer in the monomer mixture or in the sidechain formed on the lignite can vary from 0.01 to 99.99. The other monomers make up the rest of the mixture or sidechain.

It is an object of the present invention to provide an article of manufacture comprising the graft copolymer of lignite.

Further, it is an object of the present invention to provide a series of methods for synthesizing a lignite graft copolymer. It is also an object of the present invention to provide a spectrum of reagents to use in the processes for preparing the lignite graft copolymer. A method for preparing a water-insoluble, thermoplastic, graft copolymer of lignite is: adding lignite to a solvent or monomer to thereby form a mixture; and then adding a halide salt; a peroxide; and more monomer. This method may include:

1) crushing lignite to a numerical mesh value of between 1 and 1,000;
2) adding the crushed lignite to a solvent, said solvent is selected from the group consisting of dimethyl sulfoxide (DMSO), dimethyl acetamide (DMAc), dimethyl formamide (DMF), 1,4-dioxane, 1-methyl-2-pyrrolidianone, an (organic solvent)-water mixture and pyridine;
3) adding a halide salt, wherein said halide salt selected from the group consisting of calcium, magnesium, sodium, potassium, ammonium, and lithium chloride; calcium, magnesium, sodium, potassium, ammonium, and lithium bromide; and calcium, magnesium, sodium, potassium, ammonium, and lithium fluoride;
4) adding at least one of a hydroperoxide or a solid peroxide, wherein said hydroperoxide is selected from the group consisting of hydrogen peroxide, 2-hydroperoxy-1,4-dioxycyclohexane, 3,3-dimethyl-1,2-dioxybutane, and the anhydrous solid peroxides: sodium peroxyborate, magnesium peroxyphthalate, and sodium percarbonate, such that the halide salt concentration of the reaction mixture ranges from about 0.1 weight percent to about 4.0 weight percent, the halide ion concentration of the reaction mixture ranges from about 0.04 weight percent to about 2.5 weight percent, and the hydroperoxide to halide ion mole ratio of the reaction mixture ranges from about 0.17 to about 2.30;
5) adding at least one of a haloethene where a haloethene is a monohalide- to tetrahalide-substituted ethene with the halide being fluorine, chlorine, or bromine; 1-phenylethene; 1-methyl-1-phenylethene; 1-(n-halophenyl)ethene where n is 2, 3, or 4 and the halide substituent is fluorine, chlorine, or bromine; 1, n-diethenylbenzene, where n=2, 3, or 4; 1,3-butadiene; 2-methyl-1,3-butadiene; 1-methyl-1-phenylethene; 2-chloro-1,3-butadiene; 2-oxo-3-oxypent-4-ene; a 2-methyl-3-oxo-4-oxybut-1-ene-(p-ethoxy-(3*p+3)-ol) and p varies from 0 to 300,000; 2-oxy-3-oxopent-4-ene; 4-methyl-2-oxy-3-oxopent-4-ene; propene; or ethene; thereby initiating free radical polymerization and allowing the reaction to proceed for about one hour to about 200 hours at a temperature of 0° to 40° C.;
6) conducting the reaction with a mole ratio of halide ion to peroxide which is 0.10 or greater, a mole ratio of total peroxide to total lignite which is 0.50 or greater, and a mole ratio of total monomer to total lignite which is 1.0 or greater;
7) continuously stirring the reaction vessel under an inert gas atmosphere at a rate between 0.1 and 100 Hertz; or
8) terminating the reaction by the addition of a free radical scavenger.

It is also an object of the present invention to provide a method of boosting or enhancing polymer molecular weights during polymerization reactions.

DETAILED DESCRIPTION OF THE PREFERRED EMBODIMENTS

In accordance with the present invention, there is provided a graft copolymer of lignite. The invention comprises a lignite macromolecule to which, possibly to one of the aromatic rings of the macromolecule, is grafted an alkene monomer, $M_1$, or alkene monomers, $M_1$ and $M_2$, such that the graft copolymer has a central lignite network and at least one grafted side chain having repeat units of polymerized $M_1$, said polymerized units being denoted $M_1'$, or randomly repeating units of polymerized $M_1$ and $M_2$, said polymerized units being denoted $M_1'$ and $M_2'$, wherein $M_1$ and $M_2$ are ethenes polymerizable by free radical polymerization and the substituents on $M_1$ and $M_2$ are selected from the group of alkanes, alkenes, abides, acids, alcohols, alkoxides, esters, halogens, cycloalkanes, phenols, and nitriles and such groups further substituted with one or more groups.

Typical structures of $M_1'$ and/or $M_2'$ would be:

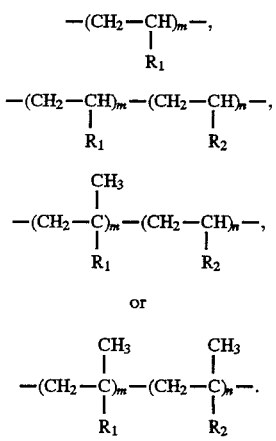

In these formulas, m and n are integers varying from 1 to 300,000. $R_1$ and $R_2$ are organic or inorganic functional groups which do not interfere with free radical polymerization, and the structures presented represent typical polymer or random-sequence, copolymer sidechains attached to lignite by the process of this invention. The average number of sidechains attached to a lignite backbone, "x", may vary between 1 and 500.

By way of further explanation, organic or inorganic functional groups which do not interfere with free radical polymerization are those groups characterized by a redox potential for one electron extraction greater than that for an carbon-carbon, double bond. To further define the structures of the substituent groups, let "i" be an integer between 1 and 7, let "r" be an integer between 1 and 200, and let "i" be an integer between 1 and 30. Typical structures of $R_i$ are fluoro, $F^-$; chloro, $Cl^-$; bromo, $Br^-$; iodo, $I^-$; hydro, $H$; alkyl including methyl=$CH_3$—, ethyl=$CH_3CH_2$—, propyl=$CH_3CH_2CH_2$—, prop-2-yl=$CH_3CH$—$CH_3$, and higher alkane analogs of the formula $C_rH_{2r+1}$—; aromatic including phenyl=$C_6H_5$, naphthalenyl=$C_{10}H_7$—, and higher analogs=$C_{4q+2}H_{2(q-1)+5}$—; alkylaromatic including alkylphenyl=$C_rH_{2r+1}C_6H_5$, alkylnaphthalenyl=$C_rH_{2r+1}C_{10}H_7$—, and higher analogs=$C_rH_{2r+1}C_{4q+2}H_2$ $_{(q-1)+5}$— where the alkyl group or groups are placed at any substituent point on the aromatic ring; haloaromatics=$C_{4q+2}H_{2(q-1)-i+5}X_i$— where X is any halide; cyano; ether, —O—$C_rH_{2r+1}$; ester, —O—C(O)$C_rH_{2r+1}$; amide, $C_{r-1}H_{2(r-1)}C(O)N(R_i)_2$; sulfate, —$SO_3^-$; carboxylic acid=$C_{r-1}H_{2(r-1)}C(O)OQ$ where Q=$H^+$, $Li^+$, $Na^+$, $K^+$, $Rb^+$, $Cs^+$, $Fr^+$, $Ca^{+2}$, $Zn^{+2}$, or $NH_4^+$; alcohols, $C_{r-1}H_{2(r-1)}OH$; carboxylic acid esters, $C_{r-1}H_{2(r-1)}C(O)OC_rH_{2r+1}$; or common variants and combinations of these structures.

A monomer is defined to be hydrophobic if it has a dipole moment of less than 1.2 or a water solubility of less than 5 g/100 g water at 30° C. A monomer is defined to be hydrophilic if it has a dipole moment greater than 1.2 and a water solubility of greater than 5 g/100 g water at 30° C. When performed with a hydrophobic monomer, the invention provides a lignite graft copolymer which possesses the desirable properties of a thermoplastic: strength, impact resistance, and capacity for deformation at higher temperature. When performed with a hydrophilic monomer, the invention provides a lignite graft copolymer in high yield which possesses the desirable properties of a process polymer: solubility in industrial solvents, surface activity, and the capacity to change process rheology. The invention further provides a method for preparing graft copolymers made from hydrophobic monomers and graft copolymers formed in high yield from hydrophilic monomers. The preparation of this copolymer is accomplished, in general, under oxygen-free conditions by adding a redox initiator, a halide salt, and one or more monomers, $M_1$ and $M_2$ for example, to a lignite dispersion in a suitable solvent and allowing time for graft polymerization to occur.

DETAILED DESCRIPTION OF THE GENERAL PROCESS

The process for preparation of lignite graft copolymer in solvent will now be illustrated for a sample composed of between 0.02 and 40.0 weight percent lignite; 0.01 and 40 weight percent monomer; 0.2 to 15.3 weight percent halide salt; and 0.1 to 98 weight percent solvent. Significant variation in reaction mixture composition is possible as will be illustrated in the examples to follow. This method will now be described, generally.

As a suitable solvent for the graft copolymerization of the present invention, it should be noted that often organic solvents are used and, of these, solvents which dissolve both the monomer and the product copolymer are preferred to make graft copolymers of lignite. Particularly noteworthy are the solvents dimethyl sulfoxide (DMSO), dimethyl acetamide (DMAc), dimethyl formamide (DMF), 1,4-dioxane, 1-methyl-2-pyrrolidianone and pyridine. Of course, mixtures of these solvents can also be used such as 50/50 (vol/vol) mixtures of DMSO and 1,4-dioxane. However, it is also possible to use inorganic solvents such as water, as well as mixtures with the above, for the reaction. If surface altered, lignite particles are desired, it is best to use a solvent which does not dissolve the lignite. The monomer may act as the solvent in some cases.

It is best to run this reaction on ground or milled lignite. When mined, the lignite should be crushed with jaw crushers, gyratory crushers, or crushing rolls. For rapid solution of the lignite, it is best to further grind the lignite in a hammer mill; an impact mill; a rolling-compression mill such as a bowl mill or roller mill; an attrition mill; or a revolving mill such as a rod mill, ball mill, pebble mill, tube mill, or compartment mill. For very rapid dissolution of lignite in solvent, the solid can be treated with an ultrafine grinder such as a hammer mill with internal classification, a fluid-energy mill, or an agitated mill. Size of the produced lignite can be specified by mesh number where mesh is defined in Van Nostrand's Scientific Encyclopedia, Fifth Edition, Page 712, (1976).

These comminution processes produce a spectrum of particle sizes but generally the crushing gives particles of one to four mesh, the grinding gives particles of 50 to 150 mesh, and the ultrafine grinding gives particles of less than 150 mesh. Mesh is the number of openings per 2.54 cm, counting from the center of any wire in a square woven sieve. Lignite can also be dissolved in base and reprecipitated in acid to obtain a starting material for this reaction. In general, comminuted lignite can be from 1 to 1,000 mesh and the lignite can be at least one of peat, soft brown lignite, dull brown lignite, bright brown lignite, or coal.

An aliquot of about 20 mL of purified solvent is placed in a 125 mL conical flask or stopperable test tube. Appropriately milled lignite and a finely ground, preferably anhydrous, halide-containing salt are added to the purified solvent. Common halide salts used are one or several of calcium chloride, magnesium chloride, sodium chloride, potassium chloride, lithium chloride, ammonium chloride, calcium bromide, magnesium bromide, sodium bromide, potassium bromide, lithium bromide, ammonium bromide, calcium fluoride, magnesium fluoride, sodium fluoride, potassium fluoride, lithium fluoride, or ammonium fluoride.

The mixture is stirred for at least 20 minutes while being bubbled with nitrogen or another inert gas. Other such inert gases are: carbon dioxide, argon, helium, krypton, or xenon. It is best to use lignite that is finely ground to reduce time of dissolution. If 50 mesh or larger-diameter, lignite particles are used in the reaction, dissolving the lignite may take hours or days. If surface altered lignite particles are desired, lignite of appropriate diameter can be introduced into the reaction mixture and reacted immediately. After 10 minutes of inert gas saturation, a hydroperoxide such as hydrogen peroxide, sodium peroxyborate, magnesium peroxyphthalate, sodium percarbonate, or 2-hydroperoxy-1,4-dioxacyclohexane is added to the reaction mixture. This addition can be made by adding an aqueous solution of the peroxide for safe handling or the peroxide can be added directly. In certain polymerizations containing water-sensitive monomers or reagents, the use of the anhydrous solid peroxides, sodium peroxyborate, magnesium peroxyphthalate, or sodium percarbonate, is preferred. Solid ethene monomer, a nitrogen-saturated solution of monomer, liquid monomer or liquid monomer in solvent are added while nitrogen gas is bubbled into the mixture. Gaseous monomers can be bubbled into the reaction mixture before, during, or after the saturation with nitrogen. It is preferred to add the gaseous monomer after the nitrogen such that the polymerization is conducted under a blanket of gaseous monomer. The graft copolymer can also be produced by adding nitrogen-saturated monomer to a reaction mixture prepared in another solvent. Common monomers routinely used in this reaction are: 1-chloroethene; 1,1,2,2-tetrafluoroethene; 1-phenylethene; 1-(n-halophenyl)ethene where n is 2, 3, or 4 and the halide substituent is fluorine, chlorine, or bromine; 1,n-diethenylbenzene, where n=2, 3, or 4; 1,3-butadiene; 2-methyl-1,3-butadiene; 2-propenoic acid; 2-propene nitrile; 2-methyl-2-propenoic acid; 1,1-dichloroethene; 2-propenamide; N,N-dimethyl-2-propenamide; N,N-bis(2-propenamido)amine; 1-methyl-1-phenylethene; 2-chloro-1,3-butadiene; 2-oxo-3-oxypent-4-ene; a 2-methyl-3-oxo-4-oxybut-1-ene-(p-ethoxy-(3*p+3)-ol) and p varies from 1 to 300,000; 2-methyl-2N-propenamidopropane sulfonic acid which is neutralized with one or more cations chosen from among hydrogen, lithium, sodium, potassium, ammonium, zinc, magnesium, or calcium; dimethyldiprop-2-enylammonium chloride; (3-oxy-4-oxo-5-methylhex-5-enyl)trimethylammonium methylsulfate; (3-oxy-4-oxo-5-methylhex-5-enyl) trimethylammonium chloride; 2-oxy-3-oxopent-4-ene; 4-methyl-2-oxy-3-oxopent-4-ene; propene; ethene; alkene-aromatics; alkene ethers; or acrylates.

The reaction starts immediately. The flask contents will often thicken slowly but may even solidify into a precipitateladen, viscous slurry. The reaction may be run at any temperature between 0° C. and 40° C. but a controlled temperature of 30° C. has been used for most reactions used as examples herein. The reaction may be run at room temperature, between 20° C. and 27° C. Although the reaction is rapid, it is allowed to sit for two days in the examples shown here. Typical process reaction times for industrial synthesis of these graft copolymers would be 1 to 2 hours with a one hour total synthesis time preferred. Certain hydrophobic monomers give significantly higher yield if the reaction is continuously stirred. The reaction is then terminated with 0.5 mL of 1 wt. % of hydroquinone in water, exposure to oxygen, or any other radical scavenger. The reaction mixture is diluted with 100 mL of water and, if the sidechain attached to the lignite is hydrophobic, the reaction mixture is stirred until a uniform reaction product is precipitated. The solid is washed with water or suitable nonsolvent and added. To obtain product from a reaction which has placed one or more hydrophilic sidechains on lignite, the reaction mixture is first diluted with 100 mL of water. The aqueous solution can then be dialyzed against pure water using a 3,500-upper-molecular-weight-permeable, dialysis membrane for several days to obtain highest purity copolymer. The aqueous solution containing the solid is freeze-dried after dialysis or, alternatively for less pure copolymer, is freeze dried immediately after dilution with water. If the reaction mixture is a gel or thick slurry, it can be made pourable by mixing with 1 to 3 times its volume of distilled or deionized water under low shear conditions until a homogeneous, pourable system is formed from reactions which have attached a hydrophilic sidechain to lignite. This solution is then precipitated in nonsolvent. A purer product can be obtained by the dialysis-freeze drying process described above. If a hydrophobic sidechain has been attached to lignite, the precipitated graft copolymer is removed from the nonsolvent solution by filtration, washed with nonsolvent, filtered, and vacuum-dried to a constant weight. For hydrophobic graft copolymers of lignite, the addition of the 1 to 3 times reaction-mixture-volume of distilled or deionized water to the reaction mixture will precipitate the product and allow recovery of graft copolymer by filtration. Product can also be recovered by spray drying. Yield is calculated from the formula: (g=grams)

$$\text{weight percent yield} = \frac{\text{(g polymer recovered)}}{\text{g lignite added} + \text{g monomer added}}$$

It is preferred that all reagents used be of reagent grade purity but less pure materials may be used if they do not contain inhibitors for the reaction. Other changes in this procedure, evident to those skilled in synthesis or chemical manufacture can be made. Other hydroperoxides may be used in place of the hydrogen peroxide listed above. The graft copolymerization reaction can be conducted with or without stirring once the monomer and metal salt have been dispersed in the reaction mixture. However, stirring the reaction at 0.2 to 5 Hertz is preferred if not mandatory if the monomer added to the lignite is hydrophobic. The reaction is allowed to proceed for 1 to 200 hours, with 48 hours being a typical, lab-scale reaction time and 1 hr. being a preferred industrial synthesis time. It is preferred to terminate a lab-scale copolymerization by addition of a free radical scavenger such as hydroquinone and to terminate an industrial scale reaction by exposure of the reaction mixture to oxygen.

The following examples illustrate certain embodiments of this invention wherein parts and percentages are by weight and temperatures are in centigrade unless otherwise indicated. Lignite from NL Barold/NL Industries, Inc., P.O. Box 1675, Houston, Tex. 77251 and Eastman reagent-grade 2-propenamide were used in these syntheses. The particle size distribution of the lignite after milling was 68.1 weight percent of the sample larger than 200 mesh, 44.1 weight percent of the sample larger than 100 mesh, and none of the sample larger than 10 mesh. The compound 1-phenylethene was obtained from the Laboratory and Research Products Division of Kodak, Rochester, N.Y. 14650. The 1-phenylethene was purified to remove the stabilizer by washing the monomer three times with aqueous base at a ratio of 1 g 1-phenylethene to 1 mL of 2N NaOH. The stabilizer-free monomer was washed with distilled water to pH=7 and dried with anhydrous calcium chloride for 2 days. It was then distilled under vacuum at 40° C. and 20 mm Hg pressure. The central cut was collected in dark bottles and stored in a refrigerator.

1,4-Dioxacyclohexane (=paradioxane) of reagent grade and anhydrous calcium chloride were obtained from Mallinckrodt Chemical Company. Dimethyl sulfoxide, of reagent grade, from Eastman Kodak was used in these experiments. All halide salts were reagent grade. The potassium fluoride was Baker Reagent Grade, anhydrous material number 1-3124, the sodium fluoride was Baker Reagent Grade material number 3688, while the potassium bromide was from Allied Chemical, material number X108. The hydrogen peroxide used was a 30 percent, aqueous solution from lot B17A, produced by Eastman Kodak, Rochester, N.Y., 14650. The hydroquinone solution was 1 wt. % hydroquinone in distilled water. To calculate certain concentrations, a density of 1.1174 g/mL has been used for 30 percent hydrogen peroxide and a density of 1.1014 g/mL has been used for dimethylsulfoxide.

The present invention will now be further illustrated by certain examples and references which are provided for purposes of illustration only and are not intended to limit the present invention. The structure of 2-propenamide is

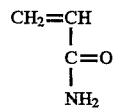

2-Propenamide

EXAMPLES

Example 1

A total of 1.06 g of lignite and 2.04 g of calcium chloride were placed in a 250 mL conical flask containing 33.36 g of dimethylsulfoxide. The lignite was milled to the particle size distribution given above. The mixture was stirred and bubbled with nitrogen ($N_2$) for about 22 minutes before 1.60 mL of 30 percent, aqueous hydrogen peroxide were added to the reaction mixture. Not all of the lignite had dissolved before the reaction was begun. $N_2$ was bubbled through the reaction mixture for about 4 more minutes and 1.08 g of 2-propenamide was added. The crystalline monomer was fluffed with $N_2$ for 30 seconds before being added to the reaction mixture and stirred into solution. After about 2 minutes of stirring and $N_2$ bubbling, the flask was stoppered and placed in a 30° C. bath for 2 days. The reaction was stirred continuously while in the bath. The reaction was then terminated by adding 0.5 mL of 1% hydroquinone and 100 mL of water thereto. The aqueous solution is dialyzed against pure water using a 3,500-upper-molecular-weight-permeable, dialysis membrane for 3 days. The dilute reaction product from the dialysis tube was centrifuged and the pelleted solids recovered by vacuum drying. The solids dissolved in the supernate were recovered by freeze drying. The water-soluble solid, labeled 26-64-1, was found to weigh 0.91 g while the water-insoluble solid, labeled 26-64-1I, was found to weigh 1.01 g. Yield=89.7 weight percent.

In the following Tables, example numbers are in parenthesis after the sample number. The material of examples 1 to 8 is poly(lignite-g-(1-amidoethylene)) and will be referred 1-amidoethylene repeat units have been grafted to the lignite, as shown in Structure 2.

The compound 2-methyl-N7,N7-dimethyl-7-ammonium-3-oxo-4-oxyoct-1-ene methylsulfate, used in example 9, was obtained from Alcolac Specialty Chemicals of 3440 Fairfield Road, Baltimore, Md., 21226, as a 75 weight percent solution in water. It was purified by freeze drying to remove water and recrystallized from ethanol-(2-propanone) (20:80 mixture by volume). The purified crystals were dried under vacuum and stored in a freezer.

TABLE 2

Results of Reactions between 2-Propenamide and Lignite.

| Polymer Number 26- | Reagents (g) | | | | | Yield$ | |
|---|---|---|---|---|---|---|---|
| | Lignite | CaCl$_2$ | 2-Propenamide | H$_2$O$_2$ | Solvent | Sol/Insol Weight in Grams | Sol/Insol Weight Percent |
| 64-1(1) | 1.06 | 2.04 | 1.08 | 1.60 | 33.36 | 0.91/1.01 | 42.5/47.2 |
| 64-2(2)¹ | 1.08 | 2.38 | 2.17 | 1.60 | 33.89 | 5.14/.42 | 158/12.9 |
| 64-3(3) | 1.05 | 1.99 | 6.11 | 1.60 | 32.86 | 6.10/0.73 | 85.2/10.2 |
| 66-4(4) | 1.03 | 2.03 | 6.21 | 1.60 | 36.88 | 5.76/0.94 | 79.6/13.0 |
| 66-5(5) | 1.05 | 1.19 | 6.11 | 1.60 | 32.86 | 8.14/0.50 | 109/6.73 |
| 66-6(6) | 1.05 | 1.99 | 6.11 | 1.60 | 32.86 | 7.94/0.60 | 113/8.52 |
| 68-7(7) | 1.18 | 2.02 | 5.99 | 1.00 | 39.87 | 5.87/0.76 | 82.1/10.6 |
| 68-8(8) | 1.06 | 2.01@ | 6.04 | 1.60 | 42.43 | 1.45/0.81 | 20.4/11.4 |
| 68-9(9) | 1.05 | 2.12 | 15.88# | 1.60 | 39.67 + 4.05* | 4.55/0.65 | 26.9/3.84 |

$ = Sol/Insol is the weight or weight percent of soluble or insoluble yield created in the product.
¹Example 2 may be contaminated with calcium salts.
@ = The halide salt used in this reaction was potassium bromide.
# = The monomer used in reaction 26-68-9 was Sipomer Q5-80[55-05-03], a cationic ethanol ester of methacrylic acid made by Alcolac Chemical Company, 3440 Fairfield Road, Baltimore, Maryland, 21226. The IUPAC chemical name is 2-methyl-N7,N7-dimethyl-7-ammonium-3-oxo-4-oxyoct-1-ene methylsulfate.
* = Example 9 received 4.05 g of water in addition to the 39.67 g of DMSO added as solvent.

to as copolymer 1. Examples 1 to 3 show that the graft copolymer can be made with differing amounts or ratios of monomer and lignite in the reaction. All such mixtures produce copolymer and the lignite fraction of the product can be varied from 0 to 100 weight percent. Further, as shown, the composition of the reaction and the lignite and monomer content of the final product can be varied extensively. Example 8 shows that many halide salts and specifically bromide salts can be used to make the graft copolymer since potassium bromide is used in this example instead of the calcium chloride used in example 1. The data of Table 2 show that the graft copolymerization can be run in many solvents since the solvent for example 4 was 1,4-dioxacyclohexane. Some other solvents are dimethyl acetamide (DMAc), dimethyl formamide (DMF), 1-methyl-2-pyrrolidianone and pyridine. Of course, mixtures of these solvents can also be used such as 50/50 (vol/vol) mixtures of DMSO and 1,4-dioxacyclohexane. However, it is also possible to use various mixtures of the above solvents, such as a 50150 (vol/vol) mixture of DMSO with water. The data of Table 2 also show that this invention allows the grafting of lignite particles since a Kjeldahl analysis of the lignite gives a nitrogen content of 0.680 and 0.696 weight percent for 1 and 2 g samples, respectively, but a Kjeldahl analysis of the insoluble lignite particles, 26-64-31, of example 3 showed a nitrogen content of 5.748 weight percent. Thus,

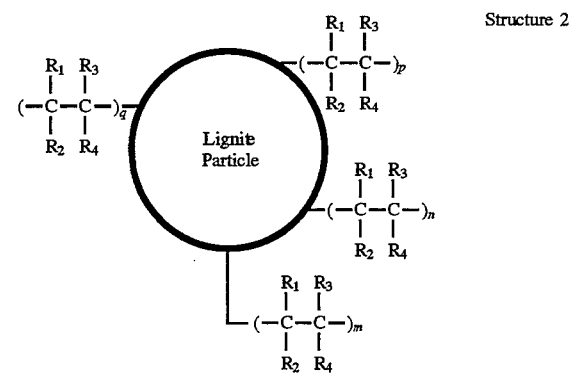

Structure 2

The structure of 2-methyl-N7,N7-dimethyl-7-ammonium-3-oxo-4-oxyoct-1-ene methylsulfate or chloride is

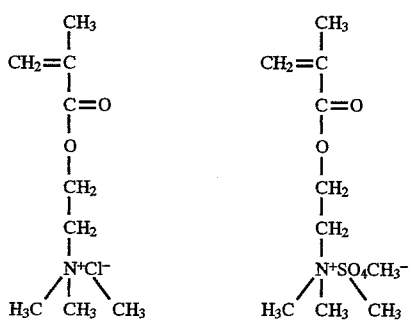

2-methyl-N7, N7-dimethyl-7-ammonium-3-oxo-4-oxyoct-1-ene chloride 2-methyl-N7, N7-dimethyl-7-ammonium-3-oxo-4-oxyoct-1-ene methylsulfate The chloride salt of the monomer can also be reacted with lignite.

In the following examples, lignite will be reacted with 1-phenylethene to form a plastic graft copolymer of lignite. The structure of 1-phenylethene is 1-Phenyl ethene
$CH_2=CH$

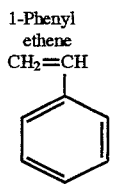

example 10 and became very hot when the $H_2O_2$ was added to the dissolved lignite and $CaCl_2$. These reactions did not explode out of the reaction vessel, however, and were run to completion. This method for reacting 1-phenylethene is illustrated with the following detailed procedure for Example 11.

EXAMPLE 11

A total of 8.07 g of lignite and 6.02 g of calcium chloride were placed in a 250 mL conical flask containing 42.73 g of dimethylsulfoxide. The mixture was stirred on a magnetic stirrer for several hours to dissolve the $CaCl_2$ and lignite in the solvent. The uniform solution, when formed, had a temperature of over 35° C. The mixture was stirred and bubbled with nitrogen ($N_2$) for about 10 minutes before 8.0 mL of 30 percent, aqueous hydrogen peroxide were added to the reaction mixture. $N_2$ was bubbled through the reaction mixture, which was now very hot, for about 4 more minutes and 28.14 g of 1-phenylethene was added. The liquid monomer was kept in the $N_2$-saturated atmosphere box for 20 minutes before being added to the reaction mixture and stirred into solution. After about 2 minutes of stirring and $N_2$ bubbling, the flask was stoppered and placed in a

TABLE 3

Results of Reactions between 1-Phenylethene and Lignite.

| Polymer Number 35- | Reagents (g) | | | | | Yield | | Weight Percent Conversion, Monomer |
|---|---|---|---|---|---|---|---|---|
| | Lignite | CaCl$_2$ | 1-Phenylethene | H$_2$O$_2$ | Solvent | Weight in Grams | Weight Percent | |
| 123-1(10) | 8.01 | 6.05 | 28.14 | 8.0 | 40.32 | 0.0 | 0.0 | 0.0 |
| 123-2(11) | 8.07 | 6.02 | 28.14 | 8.0 | 42.73 | 27.41 | 75.70 | 68.73 |
| 123-3(12) | 8.02 | 6.03 | 18.76 | 8.0 | 40.11 | 13.30 | 49.66 | 28.46 |
| 125-1(13) | 8.03 | 6.00 | 28.14 | 8.0 | 40.08 | 30.22 | 85.55 | 78.86 |
| 125-2(14) | 8.08 | 6.02 | 18.76 | 8.0 | 40.03 | 24.71 | 92.06 | 88.65 |
| 125-3(15) | 8.01 | 6.05 | 9.38 | 8.0 | 40.11 | 15.16 | 87.18 | 76.23 |
| 126-1(16) | 8.05 | 0.0 | 28.14 | 8.0 | 40.01 | 7.19 | 19.86 | 0.0 |
| 126-2(17) | 8.03 | 0.0 | 18.76 | 8.0 | 40.25 | 7.53 | 28.11 | 0.0 |
| 126-3(18) | 8.01 | 0.0 | 9.38 | 8.0 | 40.35 | 7.11 | 40.89 | 0.0 |

EXAMPLE 10

A total of 8.01 g of lignite and 6.05 g of calcium chloride were placed in a 250 mL conical flask containing 40.32 g of dimethylsulfoxide. The mixture was stirred on a magnetic stirrer for several hours to dissolve the $CaCl_2$ and lignite in the solvent. The uniform solution, when formed, had a temperature of over 35° C. The sample was stirred and bubbled with nitrogen ($N_2$) for about 10 minutes before 8.0 mL of 30 percent, aqueous hydrogen peroxide were added to the reaction mixture. The reaction foamed and spewed out of the reaction vessel, resulting in a zero yield and recovery of product. The reaction was labeled 35-123-1. Yield=0.0 wt. %.

The lignite used in the examples of Table 3 was extracted with 100 mL of benzene for 48 hours before use in the reactions. Examples 11 and 12 were run in the same way as 30° C. bath for 2 days. The reaction was stirred continuously while in the bath. The reaction was then terminated by adding 0.5 mL of 1% hydroquinone and was poured into 1 L of aqueous, 0.33M HCl. The precipitated reaction product was filtered through a Buchner funnel and the solids recovered. The solid was found to weigh 27.41 g. The product was labeled 35-123-2. Yield=75.70 wt. %. The brown-black solid was extracted with benzene by taking 10.80 g of 35-123-2 and placing it in a Soxhlet extractor and extracted for 48 hours with 100 mL of benzene. A total of 2.78 g of product was not dissolved by exhaustive benzene extraction. This means that all of product 35-123-2 contains 20.35 g of material which can be dissolved in benzene and 7.06 g of material that can not be dissolved. This means that a minimum of 1.01 g of lignite (8.07–7.06 g) was made soluble in benzene by the reaction. The reaction which would do this is grafting:

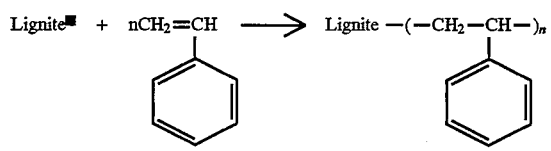

In actuality, the 2.78 g of material not dissolved in benzene during the extraction contains large amounts of poly(1-phenylethylene) grafted to lignite, as confirmed by chemical and physical tests. Thus, much more than 1.01 g of lignite has been grafted and most, if not all of the lignite placed in the reaction, has been grafted.

Examples 13, 14, and 15 were run in an altered fashion to avoid the danger of reaction explosion. This altered method is illustrated With the following detailed procedure for Example 13.

EXAMPLE 13

A total of 8.03 g of lignite and 6.00 g of calcium chloride were placed in a 250 mL conical flask containing 40.08 g of dimethylsulfoxide. The mixture was stirred on a magnetic stirrer for several hours to dissolve the $CaCl_2$ in the solvent. The uniform solution, when formed, was placed in a refrigerator and cooled to 10° C. The mixture was stirred and bubbled with nitrogen ($N_2$) for about 10 minutes before 8.0 mL of 30 percent, aqueous hydrogen peroxide were added to the reaction mixture. $N_2$ was bubbled through the reaction mixture, which had warmed to about 35° C., for about 4 more minutes and 28.14 g of 1-phenylethene was added. The liquid monomer was kept in the $N_2$-saturated atmosphere box for 20 minutes before being added to the reaction mixture and stirred into solution. After about 2 minutes of stirring and $N_2$ bubbling, the flask was stoppered and placed in a 30° C. bath for 2 days. The reaction was stirred continuously while in the bath. The reaction was then terminated by adding 0.5 mL of 1% hydroquinone and was poured into 1 L of aqueous, 0.33M HCl. The precipitated reaction product was filtered through a Buchner funnel and the solids recovered. The solid was found to weigh 30.22 g. The product was labeled 35-125-1. Yield=85.55 wt. %.

The results of examples 11 to 15 show that virtually any weight fraction of lignite can be incorporated into a 1-phenylethylene-containing, graft copolymer. The samples had lignite contents of from 22.3 to 46 weight percent in the reaction mixture and all reacted. Further, a comparison of yields between two pairs of examples: 1.=11 and 13 and 2.=12 and 14, respectively, shows that the cooling of the lignite solution before the initiation of polymerization increases yield by at least a factor of 1.2. This increase in yield may be caused by the failure of the cool lignite solution to exothermically decompose the hydroperoxide, thus unleashing a self-propagating process of decomposition, heating, and decomposition that can result in a spontaneous expulsion of the reactor contents from the reaction vessel, as occurred in example 10. Pre-reaction cooling thus not only increases yield, it also increases the safety of the polymerization process. Examples 16 to 18 show that the presence of chloride ion and lignite are critical to forming graft copolymer. Examples 16, 17, and 18 all show no yield of copolymer when no halide ion is present in the reaction mixture. The halide is critical to the polymerization and, along with hydroperoxide, must be present to allow copolymer to be formed. The results of previous studies show that there is an optimum ratio of peroxide to chloride to lignite. This ratio must be determined experimentally for each monomer, solvent, and set of process conditions chosen for the reaction.

The nitrogen content of the samples of Table 4 were 27-126-1=17.38 weight percent, 27-126-2=16.36 weight percent, and 27-126-3=15.37 weight percent, as determined by Kjeldahl analysis.

TABLE 4

Further Results of Reactions between 2-Propenamide and Lignite.

| Polymer Number 27- | Reagents (g) | | | | | Yield | |
|---|---|---|---|---|---|---|---|
| | Lignite | $CaCl_2$ | 2-Propenamide | $H_2O_2$ | Solvent | Weight (g) | Weight Percent |
| 126-1(19) | 0.5017 | 1.52 | 4.3185 | 0.896 | 30.29 | 4.05 | 84.02 |
| 126-2(20) | 0.4996 | 1.52 | 2.8673 | 0.896 | 30.29 | 2.45 | 72.77 |
| 126-3(21) | 0.5026 | 1.52 | 1.4378 | 0.896 | 30.29 | 1.37 | 70.60 |

Examples 19 to 21 show that very different ratios of monomer to lignite can be used to produce high yields of copolymer with this art. Examples 19 to 21 show that chloride ion concentration can vary from below 1.37 weight percent of the reaction mixture to over 1.50 weight percent (example 20) with copolymer still produced from the reaction. The calcium chloride content of these reactions also varies from 0.92 weight percent to 0.47 weight percent (example 20) with product still produced in the reaction. The process for making these materials is thus flexible and versatile.

In the following example, lignite will be reacted with 2-methyl-3-oxo-4-oxybut-1-ene-(p-ethoxy-(3*p+3)-ol) to form a plastic graft copolymer of lignite. The structure of 2-methyl-3-oxo-4-oxybut-1-ene-(p-ethoxy-(3*p+3)-ol) is

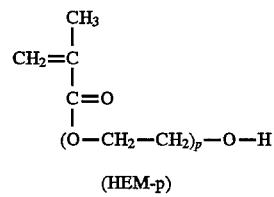

(HEM-p)

where the term (3*p+3) indicates the structural position number of the terminal hydroxyl group on the ethoxylated ester chain. Thus, when 2-methylpropenoic acid is monoesterified (p=1) with 1-oxacyclopropane, an oxygen and two carbons are added to the three carbon atom chain of the acid. One ethoxyl group has been added to the acid, the terminal hydroxyl group is on the sixth atom of the chain, and the formula to specify hydroxyl group location gives 3*1+3=6. HEM-p is an acronym for hydroxyethyl methacrylate with "p" ethoxyl units in the polyether chain.

When these monomers are reacted using lignite in accordance with the present invention, a lignite graft copolymer of the following formula is produced:

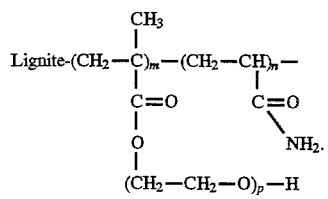

where m, n, and p are integers showing the number of repeat units of the structure preceding the integer in the molecule. The values of m, n, and p vary from 0 to 300,000.

EXAMPLE 22

A total of 1.00 g of purified, milled lignite (36-6-1 and 34-126-1) and 0.1471 g of calcium chloride were placed in a 125 mL conical flask containing 3.51 mL of dimethylsulfoxide. This was labeled flask A. Flask B received 0.37 g of 2-propenamide, 0.20 g of HEM-5 monomer as identified in the formula above with p=5, and 2.93 mL of dimethylsulfoxide. Flask C received 0.0975 g of 2-propenamide and 1.61 mL of dimethylsulfoxide. The mixtures was stirred and bubbled with nitrogen ($N_2$) for at least 10 minutes before 0.24 mL of 30 percent, aqueous hydrogen peroxide were stirred into flask A. $N_2$ was bubbled through the reaction mixture for about 5 more minutes and flask C was poured into flask A. After about 3 minutes of stirring and $N_2$ bubbling, flask B was poured into flask A, the flask was stoppered, and was placed in a 30° C. bath for 2 days. The reaction was then terminated by adding 0.5 mL of 1% hydroquinone and 100 mL of water thereto. The aqueous solution is dialyzed against pure water using a 3,500-upper-molecular-weight-permeable, dialysis membrane for 3 days. The dilute reaction product from the dialysis tube was centrifuged and the pelleted solids recovered by vacuum drying. The solids in the dilute, dialyzed reaction mixture were recovered by freeze drying. The solid was found to weigh 1.28 g. The product was labeled 36-7-1. Yield=76.6 weight percent. The nitrogen content of the product was 3.49 weight percent and the lignite content, as determined by ultraviolet spectroscopy, was 61.5 weight percent.

In the examples of Table 5, the monomer used was 4-methyl-2-oxy-3-oxopent-4-ene, [80-62-6].

TABLE 5

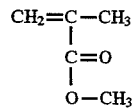

4-Methyl-2-Oxy-3-
Oxopent-4-ene
Copolymerization Reactions of Lignite and 4-Methyl-2-oxy-3-oxopent-4-ene.

| Sample Number | Reactants (g) | | | | | Yield |
| | Solvent* | Lignite | CaCl$_2$ | A | H$_2$O$_2$ (mL) | (g)/ (wt. %) |
| --- | --- | --- | --- | --- | --- | --- |
| 46-86-1(23) | 32.79 | 1.02 | 1.31 | 0.55 | 0.964 | 0.90/57.3 |
| 46-86-2(24) | 32.81 | 1.03 | 1.29 | 1.05 | 1.00 | 1.39/68.5 |
| 46-86-3(25) | 32.67 | 1.05 | 1.28 | 1.51 | 1.00 | 0.84/32.8 |

TABLE 5-continued $$CH_2=C-CH_3$$
$$|$$
$$C=O$$
$$|$$
$$O-CH_3$$

4-Methyl-2-Oxy-3-
Oxopent-4-ene
Copolymerization Reactions of Lignite and 4-Methyl-2-oxy-3-oxopent-4-ene.

| Sample Number | Reactants (g) | | | | | Yield |
| | Solvent* | Lignite | CaCl$_2$ | A | H$_2$O$_2$ (mL) | (g)/ (wt. %) |
| --- | --- | --- | --- | --- | --- | --- |
| 46-86-4(26) | 32.61 | 1.07 | 1.26 | 2.00 | 1.00 | 2.38/77.5 |
| 46-86-6(27) | 32.78 | 1.06 | 1.26 | 3.00 | 1.00 | |

A = 4-methyl-2-oxy-3-oxopent-4-ene, [80-62-6].
*Solvent is dimethylsulfoxide.

Samples 46-86-1 to 46-86-3 were synthesized by the procedure of example 11. The reaction mixtures were very hot before the vessels were placed in the 30° C. bath. Samples 46-86-4 and 46-86-6 were synthesized by the procedure of example 13, however, with the change that the mixture of lignite, solvent, and calcium chloride was placed in an ice bath before the hydrogen peroxide and monomer were added. The reaction mixtures were at less than 4° C. before the vessels were placed in the 30° C. bath. Note that cooling reactions 46-86-4 and 6 during mixing of the reactants sharply increased the yield of the reactions when compared to reactions 46-86-1 to 3. Cooling the reaction mixture during mixing of the reactants and particularly before addition of hydrogen peroxide to the reaction sharply increases product yield. The reaction should be cooled to at least 40° C. with cooling to within 10° C. of 0° C. preferred.

These data clearly show that numerous, different graft copolymers can be made by conducting this reaction with lignite and monomers that react by free radical polymerization. The products of examples 10 to 27 are thermoplastics which can be thermoformed at temperatures above the glass transition temperature of the product and pressures above 1 atmosphere into articles of manufacture.

Comparative Examples

A general method by developed make graft copolymers of lignite has been developed. It is the only way to make hydrophilic and hydrophobic graft copolymers of lignite. The method allows quantitative grafting of lignite to produce graft copolymers in high yield. The method initiates on lignite and produces grafting of monomers that make plastics out of lignite by grafting. Patents by Huddleston, U.S. Pat. Nos. 5,028,271 and 4,938,803, and Fry, U.S. Pat. Nos. 4,703,801 and 4,676,317, claim the formation of certain, water-soluble graft copolymers from hydrophilic monomers by polymerization of those monomers in the presence of lignite. This disclosure does not seek to refute Huddleston and Fry, despite their lack of chemical innovation, but rather teaches a general method of graft copolymerization of lignite which circumvents the limitation of Huddleston-Fry to hydrophilic monomers and allows any ethene monomer to be grafted onto lignite.

Running a polymerization of a hydrophilic monomer in water by chain reaction with a free radical active site is disclosed in the patents by Huddleston, U.S. Pat. Nos. 5,028,271 and 4,938,803, and the patents of Fry, U.S. Pat.

Nos. 4,703,801 and 4,676,317. These patents use a polymerization run in, the presence of an additive to conduct a free radical reaction. A polymerization run in the presence of an additive is an alteration of an existing polymerization method for reacting a given monomer. An example of the existing polymerization method for the monomer is prepared and the reaction is contaminated with an additive which is supposed to become the backbone of a graft copolymer. The polymerization is run and the product is labeled a graft copolymer of the additive. The problems with this approach are several: 1. Contaminating a previously functional polymerization with an additive allows components of the additive or the additive itself to interfere with the polymerization. The result is a reduced or zero yield of polymer. 2. The polymerization being contaminated with an additive was not designed to initiate polymerization upon and create copolymer with, the additive. If any grafting reactions occur with the additive, they occur in the termination reaction of the polymerization, leading to a. lower molecular weights in the product as the result of chain transfer or b. lower yield as a result of loss of an active polymerization site. 3. Since the polymerization method was a known reaction, it initiates and propagates the polymerization of the monomer just as it was originally designed to do. Graft copolymer may be formed only in termination by combination of radicals or by chain transfer attack of the polymerizing chain onto the backbone. Polymerizations with low or zero chain transfer rates or termination by disproportionation yield no graft copolymerization. They do not allow grafting of any molecules of the additive. 4. Any limitations of the method chosen as the basis for the polymerization in the presence of additive continue to be limitations of the method.

It is impossible by previous methods to graft lignite with hydrophobic monomers. With ethene monomers with dipole moments below 1.2 or water solubilities of less than 5.0 g of monomer per 100 g of water at 30° C., reactions run according to previously disclosed procedures give zero yield of graft copolymer.

It is important to compare the process illustrated by the preceding 27 examples with methods that try to make graft copolymer by contaminating a polymerization with an additive, such as the patents by Huddleston, U.S. Pat. Nos. 5,028,271 and 4,938,803, and the patents of Fry, U.S. Pat. Nos. 4,703,801 and 4,676,317. One of the major limitations of the polymerization method chosen by Fry and Huddleston is the restriction to the use of water as solvent. Because of this limit, the patents by Huddleston, U.S. Pat. Nos. 5,028,271 and 4,938,803, and the patents of Fry, U.S. Pat. Nos. 4,703,801 and 4,676,317, can not be used to make hydrophobic, thermoplastic graft copolymers of lignite from nonpolar or nonhydrogen-bonding monomers. The four patents were developed in a effort to make cheap products for water-based drilling muds and cementing formulations. The medium for application of the result of the reaction and the medium for running the reaction was always water. See Huddleston, U.S. Pat. No. 5,028,271, column 8, claim 8, line 15 and U.S. Pat. No. 4,938,803, column 8, claim 16, line 42 and the patents of Fry, U.S. Pat. No. 4,703,801, column 14, claim 1, line 34 and U.S. Pat. No. 4,676,317, column 15, claim 1, line 28 for verification of this statement.

Huddleston in U.S. Pat. Nos. 4,938,803 and 5,028,271 claims whatever comes out of the free radical polymerization in the presence of lignite as a fluid loss additive for drilling muds and cementing formulations while Fry in U.S. Pat. Nos. 4,703,801 and 4,676,317 claims whatever comes out of the free radical polymerization in the presence of lignite as a fluid loss additive for cementing formulations only. Since the goal is to make an additive for water-based systems, the materials used must be water soluble. Huddleston uses carboxylic acid and amide monomers with ammonium peroxydisulfate in water as the polymerization system while Fry uses potassium peroxydisulfate and acid or amide monomers in water as the polymerization system. Peroxydisulfate is the correct name for persulfate, the redox agent for initiation of monomer polymerization in water. Fry also mentions the use of cerium ion as an initiator in U.S. Pat. No. 4,703,801, column 5, line 23. Cerium ion is formed from cerium salts, which are soluble in low concentration in water but insoluble in organic solvents.

Both the initiators and the monomers chosen by Huddleston and Fry are for water-reacted and water-based systems. The use of water and application to water is clearly spelled out in Huddleston, U.S. Pat. No. 5,028,271, column 2, lines 36, 37, and 45; column 3, line 38; column 4, lines 62 to 65; column 5, lines 8 and 59 to 63; column 6, lines 58 and 59; and column 8, line 15, Claim 8. Similar citations can be provided for the other patents. The particular limitation of monomers that the two inventors spell out clearly shows the restrictions caused by the requirements of an aqueous solvent. See Huddleston, U.S. Pat. No. 5,028,271, column 1, lines 11 to 16 and 18 to 24; column 2, lines 42 to 49 and 58 to 68; and column 3, lines 1 to 14 for the listing of monomers to be used in the reaction. The monomer list of acids, amines, amides and nonionics contains molecules with one common feature, all of the monomers are water soluble. This can be verified in the Monomer Properties Section of the *Polymer Handbook*, Third Edition, J. Brandrup and E. H. Immergut, Editors, Wiley Interscience, New York, (1989). The same pattern is found in Huddleston, U.S. Pat. No. 4,938,803, column 1, lines 0 to 12 and 15 to 21; column 2, lines 42 to 46, 55 to 66, and 68; and column 3, lines 1 to 10, 29 to 32, 53 to 58, and 59 to 68. In the patents of Fry, see U.S. Pat. No. 4,703,801, column 1, line 15 to 18; column 2, line 62 to 64 and 68; and column 3, line 1 to 4. In U.S. Pat. No. 4,676,317, see column 1, line 13 to 15; column 2, line 60 to 62 and 66 to 68; and column 3, line 1, 2 and 10 to 12.

By comparing the monomers of the patents of Huddleston and Fry with those of this disclosure, the greater generality of this synthesis process becomes evident to anyone knowledgeable about monomers and polymer chemistry. The monomers of the patents of Huddleston and Fry, some of which are 2-acrylamido-2-methylpropanesulfonic acid, acrylamide, styrenesulfonate, vinylsulfonate, and acrylic acid, form water soluble polymers as products. In this disclosure, however, the monomer list includes 1-chloroethene (vinyl chloride); 1,1,2,2-tetrafluoroethene (monomer of Teflon$^{TM}$); 1-phenylethene (styrene); 1,3-butadiene; 2-methyl-1,3-butadiene (isoprene for elastomers like natural rubber ); 1-methyl-1-phenylethene (α-methylstyrene); 2-chloro-1,3-butadiene (chloroprene); and ethene (the monomer of polyethylene). These monomere are used to make plastics. To reduce this to a level of personal experience so that the implications of the technical statements are not lost, one would not make a coffee cup from lignite using the technology of Huddleston or Fry. Such a synthesis would have to be run with styrenesulfonate, for example, and would be an attempt to form poly(lignite-g-(polystyrenesulfonate)). The product could not be used to make a coffee cup because polystyrenesulfonate is a water-soluble polymer and the coffee cup would dissolve. The —SO$_3$⁻ unit off the aromatic ring of the repeat unit of the polymer makes the polymer highly water soluble. One would, however, make a coffee cup out of lignite grafted with styrene by the technology of this disclosure because the resulting product is a plastic. The monomer is nonpolar, has no —$SO_3^-$ group, and is the building block of polystyrene and Styrofoam.

The list of monomers in this disclosure is supported by strong evidence of the utility of the new process for making thermoplastics, as shown by the data of Table 3 where 1-phenylethene (styrene) is reacted to 20 to 92 weight percent yield and 21 to 87 weight percent conversion to produce a plastic product. The properties of the new material, made by the new, more general method of synthesis, are those of a thermoplastic. This thermoplastic manufacture would be something total impossible for the materials made in the patents of Huddleston and Fry. Water-soluble polymers are water soluble because of highly polar repeat units in the polymer which hydrogen bond or ionize in water. This bonding makes heating the polymer to a fluid state and thermoplastically deforming it into plastic articles of manufacture quite impossible. The water-soluble polymer will decompose before it ever becomes fluid. The technical statement for this is that Decomposition Temperature is less than $T_g$ for water-soluble polymers. Nonpolar monomers make thermoplastics which do not dissolve in water but can be thermoplastically deformed into injection molded plastic parts. One way to phrase a major reason that the new method is so much more powerful and useful than the art cited is that it works on monomere of all polarity.

To see the capacities of this new synthesis method and to understand the implications of the comparative examples that have been performed on lignite, it is important to understand the limits of reactions in which polymer has been polymerized in the presence of lignite. When a grafting reaction is done, the best way to make graft copolymer is to have the backbone initiate the polymerization. Thus, in any free radical polymerization, there is an initiation reaction of the form:

$$I+M \rightarrow I-M.$$

For effective grafting, I must be the backbone to be grafted. What frequently occurs in an effort to make "graft copolymer" without a method to specifically attack the backbone to be grafted is to run a polymerization in the presence of backbone in the hopes that a few of the reactions terminate on the backbone or involve the backbone. The initiation reactions are the usual ones for polymerization, heat or

$$I_2 \rightarrow 2*I\cdot$$

light or $$A+D \rightarrow C+I\cdot.$$

The added chemical, I·, then reacts with monomer,

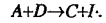

$$I+M \rightarrow I-M.$$

If, later on, the growing polymer, I–$M_n$–M–, reacts with backbone, B, a graft copolymer molecule is made. But, this happenstance reaction has to occur to make the grafted molecule. In most polymerizations, with low or zero chain transfer rates or termination by disproportionation, no graft copolymer is formed. In many polymerizations in the presence of additive, the additive is an inhibitor and no polymerization occurs. In many polymerizations that occur in the presence of additive, the product is homopolymer, I–$M_n$, contaminated with unreacted backbone, B, plus initiator residue, traces of solvent, and unreacted monomer. Since the backbone is not involved in the initiation of the polymerization, it is impossible by these reactions to quantitatively graft all of the backbone added to the reaction. Finally, since the additive may interfere with the initiation and propagation of the polymerization, the yield and conversion of the polymerization may be reduced.

In the Huddleston or Fry applications of "polymerization in the presence of additive" to lignite, a hydrophilic monomer has bee reacted in the presence of lignite. The patents by Huddleston, U.S. Pat. Nos. 5,028,271 and 4,938,803, and the patents of Fry, U.S. Pat. Nos. 4,703,801 and 4,676,317, were tested for the capacity to make hydrophobic, thermoplastic graft copolymers of lignite from nonpolar or nonhydrogen-bonding monomers. These four patents were tested for the capacity to quantitatively graft all lignite molecules in a reaction mixture. These four patents were tested for the capacity to produce high yield and high conversion to polymer from ethene monomers. The patents were developed in a effort to make cheap products for water-based drilling muds and cementing formulations. The medium for application of the result of the reaction and the medium for running the reaction was always water.

The comparative examples were designed using three criteria. They are:

1. That in the mole ratios of components and the reagents used, the Huddleston/Fry reactions be comparable to reactions run in this disclosure so that a direct comparison of the results of the reactions would be possible.
2. That the Huddleston/Fry reactions be run in commonly accepted practice and good synthetic procedure associated with the conduct of peroxydisulfate-initiated, free radical reactions. This would compensate for the fact that specific method steps and procedures which constitute the chemical art of synthesis are absent from the Huddleston/Fry patents.
3. That some of the Huddleston/Fry reactions be run with monomers which are not included in the patents by Huddleston, U.S. Pat. Nos. 5,028,271 and 4,938,803, and the patents of Fry, U.S. Pat. Nos. 4,703,801 and 4,676,31 7, but are specifically reduced to practice in this disclosure. These "different monomer" reactions were run to show the distinctive, expanded synthesis capacity of the hydroperoxide/chloride method in comparison to the Huddleston/Fry patents.

The experimental design was to run two reactions with each of three monomers. One of each of the two reactions would be unstirred while the other would be stirred. The three monomers would be acrylamide; a reactive, water-soluble monomer that is cited in the Huddleston/Fry patents and can be used to make water soluble polymers; 2-propene nitrile; a reactive, water-soluble monomer that can be used to make water-insoluble plastics often called Orlon; and 1-phenylethene, a reactive, water-insoluble monomer that can be used to make water-insoluble plastics commonly known as polystyrenes.

The Huddleston/Fry reactions were run in water, as required by the patents. The lignite used was from NL Baroid/NL Industries, Inc., P.O. Box 16745, Houston, Tex. 77251. The reagent mixtures were within the bounds of the Huddleston composition claims for acrylamide and also match the lignite-acrylamide ratio of Example 4, sample number 26-66-4, in Table 2 of this disclosure. The first reaction composition was 2.5 g of lignite, 16.0 g of acrylamide, 100 mL of water, and 0.057 g of ammonium peroxydisulfate initiator. The reactions were run at 60° C. under one atmosphere of nitrogen pressure in a glass flask. The reactions with the two other monomers were designed to contain the same number of moles of monomer as the acrylamide reactions. The amount of initiator was such that one molecule of initiator was placed in the reaction for every 10,000 atomic mass units of lignite. For a 90,000 molecular weight lignite, this would cause nine initiations per one molecule of lignite. This should be enough to promote a maximum amount of grafting. The composition of the reactions is given in Table 6.

TABLE 6

Composition of Reaction Mixtures Based on Huddleston/Fry.

| Sample Number* | Monomer Name | Weight of Reagent Used (g). | | | Solvent Water, (mL) | Reaction Stirred? |
|---|---|---|---|---|---|---|
| | | Lignite | $(NH_4)_2S_2O_8$# | Monomer | | |
| 42-111-1(28) | acrylamide | 2.50 | 0.057 | 16.0 | 100. | Yes |
| 42-111-6(29) | acrylamide | 2.50 | 0.057 | 16.0 | 100. | No |
| 42-111-2(30) | 2-propene | 2.50 | 0.057 | 11.96 | 100. | Yes |
| 42-111-5(31) | nitrile | 2.50 | 0.057 | 11.96 | 100. | No |
| 42-111-3(32) | 1-phenyl- | 2.50 | 0.057 | 23.47 | 100. | Yes |
| 42-111-4(33) | ethene | 2.50 | 0.057 | 23.47 | 100. | No |

*Example numbers in parenthesis.
# = Ammonium Peroxydisulfate

The lignite was added to the water in a 250 mL conical flask and the suspension was mixed for 30 minutes as nitrogen was bubbled through the mixture. The initiator was added and the mixture was again bubbled with nitrogen for 30 minutes. The monomer was added, the reaction vessel was sealed, and the reaction was placed on a 60° C. stirrer-hot plate. The reactions were run for 48 hours on the stirrer-hot plates. The addition of monomer caused the reactions to become more single phase. Reaction 42-111-3 became three phase while reaction 42-111-1,4, and 5 became homogeneous.

Reaction 42-111-2 exploded within one hour of being put on the hot plate. Because of the explosion, reaction 42-111-5 was also stopped. The cause of the explosion was pressure build up from the low boiling 2-propene nitrile in the conical flask. The boiling point of 2-propene nitrile is 77° C. As the monomer was heated, it evaporated and created a greater than 1 atmosphere pressure in the reaction vessel. This blew the stopper off the conical flask and terminated reaction 42-111-2. Reactions 42-111-3 and 42-111-4 were run to completion and terminated by emptying the reaction flask into pH=2.0 water. Reactions 42-111-1 and 42-111-6 were run to completion and terminated by dialyzing the product for one week in Number 2, SpectraPor dialysis membrane before freeze drying it.

Reaction 42-111-5 was redone using the same composition given in Table 6 but at a 30° C. temperature. The initiation reaction would be the oxidation of a hydroxyl group in the reaction mixture such as occurs within propan-2-ol. The only 30° C. reaction was run to completion and terminated by emptying reaction 42-111-5 into water. The yield of the reactions is given in Table 7.

TABLE 7

Yield of Reaction Mixtures Based on Huddleston/Fry.

| Sample Number 42- | Monomer | Reaction Stirred? | Yield of Reaction[a] | | Conversion[b] | |
|---|---|---|---|---|---|---|
| | | | (g) | (Wt. %) | (g) | (Wt. %) |
| 111-1(28) | acryl- | Yes | 2.5431 | 13.75 | 0.043 | 0.27 |
| 111-6(29) | amide[c] | No | 2.5500 | 13.78 | 0.055 | 0.34 |
| 111-2(30) | 2-propene | Yes | Exploded. | | 0.0 | 0.0 |
| 111-5(31) | nitrile[c] | No | 2.33 | 16.15 | 0.0 | 0.0 |
| 111-3(32) | 1-phenyl- | Yes | 2.12 | 8.15 | 0.0 | 0.0 |
| 111-4(33) | ethene[c] | No | 2.10 | 8.09 | 0.0 | 0.0 |

[a]Yield based on mass of lignite and monomer charged to the reaction
[b]Conversion based on weight gain above the 2.50 g of lignite charged to the reaction.
[c]Acrylamide is a hydrophilic monomer while 2-propene nitrile and 1-phenylethene are hydrophobic monomers.

The yields of reactions 42-111-3, 42-111-4, and 42-111-5, examples 31 to 33 run with hydrophobic monomers, are less than 2.50 grams, the amount of lignite added to the reaction. This implies no monomer conversion and no reaction but does not prove that no reaction took place. To determine whether or not reaction and grafting actually took place, a Fourier transform, infrared spectrum was run on the products of the three, Huddleston/Fry reactions. The spectra of reaction products 42-111-3 and 42-111-4 should contain a sharp absorption peak at 14.3 µm that is characteristic of polystyrene and would imply that grafting had occurred. No such peak was seen in the spectra of reaction products 42-111-3 and 42-111-4. These data show that no grafting and no reaction of monomer took place in the stirred or unstirred reactions with styrene. This compares to the 21 to 89 weight percent conversion of monomer to polymer produced by the reactions listed in Table 3 of this disclosure.

The spectra of reaction product 42-111-5 should contain a sharp absorption peak at 10.3 µm that is characteristic of poly(1-cyanoethylene) and would imply that grafting had occurred. No such peak was seen in the spectra of reaction product 42-111-5. These data show that no grafting and no reaction of monomer took place in the unstirred reaction with 2-propene nitrile.

The yield and conversion of reaction 42-111-1 can be compared to that of reaction 26-66-4, Example 4, Table 2 in this disclosure. This comparison is made in Table 8.

TABLE 8

Yield and Data of Reaction 26-66-4,
Done By The Method of This Disclosure.

| PROPERTY | VALUE OR RESULT |
|---|---|
| Sample Number | 26-66-4 |
| Example Number | 4, Table 2 |
| Total Amount of Polymerizable Material. | 7.24 |
| Yield of Reaction Product, g | 6.70 |
| Yield of Reaction Product, Wt. % | 92.54 |
| Amount of 2-Propenamide Converted to Product, g | 5.67 |
| Conversion of 2-Propenamide to Product, Wt. % | 91.30 |

The data of Tables 7 and 8 show that for acrylamide, the Huddleston/Fry method has a conversion of monomer to polymer of less than 1 weight percent while the hydrogen peroxide/halide ion method converts over 90 weight percent of the monomer into polymer. Previous work on other materials has shown that major portions of this product are graft copolymer and that virtually every backbone molecule that is placed in the reaction pot is grafted by the hydroperoxide/halide ion method. None of the four patents can be used to quantitatively graft all lignite molecules in a reaction mixture. None of the four patents can be used to produce high graft copolymer content reaction products. None of the four patents can be used to graft nonpolar monomers into thermoplastic copolymers of lignite.

These data show that this new method circumvents the synthesis failures which are encountered when ionic, acid, amine, or amide monomers are replaced by another substituted ethene with a different dipole moment and sharply reduced water-solubility. To react ethene monomers with dipole moments below 1.2 or water solubilities of less than 5.0 g of monomer per 100 g of water at 30° C. with a lignite to produce grafted lignite-containing product requires the hydroperoxide-chloride ion reaction just disclosed.

The previous examples and discussion have shown that reactions conducted with hydrophobic monomers will not produce grafting unless the invention of this disclosure, the hydroperoxide/chloride ion method, is used to conduct the reaction. Hydrophobic monomers do not have an ionic bond in the molecule. Hydrophobic monomers have a low solubility in water, usually less than 5 g of monomer per 100 g of water at 30° C. Hydrophobic monomers polymerize into water-insoluble polymers, materials with a solubility in water of less than 0.1 g per 100 g of water at 30° C. Hydrophobic monomers generally do not have a liable hydrogen in the molecule and do not engage in hydrogen bond formation in water. Hydrophobic monomers can be further characterized by the monomer's dipole moment. The symbol for dipole moment is $\mu$ and the property is expressed in units of debye, the unit being abbreviated as "D", where 1 D=$3.33564 \times 10^{-30}$ coulomb-meter. The magnitude of the dipole moment of a molecule is calculated by multiplying the distance in meters, d, between separated accumulations of positive and negative charge times the magnitude of one of the accumulations of charge, $\epsilon$, expressed in electrostatic units.

$$\mu = d \times \epsilon$$

These charge separations are structural features of a molecule caused by its atomic structure and are therefore characteristic of the molecule. The dipole moments and solubility limits of a group common monomers are given in Table 9. Note that most common ethene monomers have a solubility in water at 30° C. of less than 5 g of monomer per 100 g of water or a dipole moment of less than 1.2. These monomers could not be grafted to lignite without the art of this disclosure.

TABLE 9

Dipole Moments and Solubility Limits of Some Common Monomers.

| Monomer Name | Dipole[#] Moment | Solubility Limit in 100 g of Water at 30° C. |
|---|---|---|
| 1-Bromoethene | 1.28 | insoluble |
| 1-Chloroethene | 1.44 | 0.86 |
| 1-Fluoroethene | 1.427 | insoluble |
| 1,3-Butadiene | 0.0 | insoluble |
| 2-Propenamide | 1.38* | 215.5 |
| 2-Methylprop-2-enoic Acid | 1.65 | miscible |
| 3-Oxy-2-oxopent-4-ene | 1.70 | 2.33 |
| Cyclopentene | 0.93 | insoluble |
| Pentyne | 0.86 | insoluble |
| 2-Methyl-1,3-butadiene | 0.15 | insoluble |
| 1,3-Pentadiene | 0.68 | insoluble |
| 4-Methyl-2-oxy-3-oxopent-4-ene | 1.60 | less than 2.0 g |
| 1-Phenylethene | 0.37 | insoluble |

[#]Data from "Tables of Experimental Dipole Moments, Aubrey Lester McClellan, W. H. Freeman and Company, San Francisco, (1963)
*Dipole moment calculated from an AM1 quantum mechanical calculation on the planer 2-propenamide molecule.

Quantitative grafting of lignite is possible using the method of this disclosure but it is not automatic upon use of the method. Several chemical restrictions must be met before quantitative grafting of the lignite will occur. To define these chemical limits, several rules for the calculation of number of moles of reagents in the reaction must be established. The molecular weight used for the calculation of moles of lignite is the number average molecular weight of the material, as established by reference or accepted analytical method. The total number of moles of peroxide in the reaction mixture is the sum of the moles of each peroxide in the reaction. The moles of each peroxide in the reaction is determined by dividing the weight of each peroxide in grams by its molecular weight. The total number of moles of halide ion in the reaction mixture is the sum of the moles of each ionized halide in the reaction. The total number of moles of monomer in the reaction mixture is the sum of the moles of each monomer in the reaction. Quantitative grafting of lignite occurs when sufficient active sites are created on each lignite molecule in the presence of sufficient monomer to attach at least one monomer to each lignite molecule.

Quantitative grafting of lignite occurs when:

1. The mole ratio of halide ion to peroxide is 0.10 or greater.
2. The mole ratio of total peroxide to total lignite is 0.50 or greater. and
3. The mole ratio of total monomer to total lignite is 1.0 or greater.

Note that conditions 1 to 3 are minimum conditions. Most reactions are run at significantly higher ratios of reactants to compensate for impurities in the reagents and develop molecules with distinct sizes and shapes. The reactions shown here were designed to exceed the minimum conditions and provide a spectrum of physical properties in the products. These products could then be used to determine how the new grafted materials behaved in a number of potential applications. Conditions 1 to 3 have been met by virtually all of the examples of this disclosure, as shown by the following examples of ratio values for examples 19 to

21.

TABLE 10

Mole Ratios Between Reactants.

| Polymer* Number 27- | Reagent's Mole Ratios | | |
|---|---|---|---|
| | Monomer To Lignite | Halide To Peroxide | Peroxide To Lignite |
| 126-1(34) | 10,900 | 1.74 | 1,420 |
| 126-2(35) | 7,230 | 1.74 | 1,420 |
| 126-3(36) | 3,630 | 1.74 | 1,420 |

*Example numbers in parentheses.

Previous sections of this disclosure have detailed how this method is distinct from "polymerizations in the presence of additive". The key factor which produces this distinction is that this method initiates the polymerization on the backbone to be grafted in a new and previously unknown reaction while a "polymerization in the presence of lignite" depends on terminations on lignite that contaminates a previously known reaction to attempt to produce grafting. If these statements are true, it follows that an attempt to conduct one of the examples of this new method in the absence of lignite will result in zero yield and no polymerization. The 9 examples of Table 11 show this test and the results.

TABLE 11

Results of Reactions Containing 1-Phenylethene But No Lignite.

| Polymer Number | Reagents (g) | | | | | Yield | | Weight Percent Conversion, Monomer |
|---|---|---|---|---|---|---|---|---|
| | Lignite | CaCl$_2$ | 1-Phenylethene | H$_2$O$_2$ | Solvent | Weight in Grams | Weight Percent | |
| *35- | | | | | | | | |
| 106-1(37) | 0.0 | 6.02 | 9.39 | 8.0 | 40.04 | 0.0 | 0.0 | 0.0 |
| 114-1(38) | 0.0 | 6.00 | 18.76 | 8.0 | 40.04 | 0.0 | 0.0 | 0.0 |
| 114-3(39) | 0.0 | 6.01 | 9.39 | 4.0 | 40.24 | 0.0 | 0.0 | 0.0 |
| #40- | | | | | | | | |
| 42-1(40) | 0.0 | 2.02 | 3.55 | 3.0 | 50.02 | 0.0 | 0.0 | 0.0 |
| 42-2(41) | 0.0 | 2.05 | 4.67 | 3.0 | 50.08 | 0.0 | 0.0 | 0.0 |
| 42-3(42) | 0.0 | 2.02 | 6.05 | 3.0 | 50.05 | 0.0 | 0.0 | 0.0 |
| 42-4(43) | 0.0 | 2.02 | 8.09 | 3.0 | 50.05 | 0.0 | 0.0 | 0.0 |
| 42-5(44) | 0.0 | 2.05 | 11.34 | 3.0 | 50.04 | 0.0 | 0.0 | 0.0 |
| 42-6(45) | 0.0 | 2.02 | 18.14 | 3.0 | 50.00 | 0.0 | 0.0 | 0.0 |

*These reactions run for 48 hours but were at temperatures above 40° C. when initiated.
These reactions run for 67 hours and were run at 30° C.

The data of Table 11 clearly show that when lignite is absent from the reaction mixture, no polymerization takes place. These data again support the assertion that this grafting reaction is specifically designed to graft lignite. The data further support the critical need for initiation of polymerization on the backbone to be grafted in order to produce quantitative grafting and high yield of both polymer and graft copolymer. The absence of the backbone sharply reduces yield in the reaction and shows that lignite is apparently critical to the initiation of the reaction. The reactions of examples 37 to 39 were run by the procedure of example 10 and started at a temperature of about 30° C., reaching a temperature of above 40° C. when peroxide was added. The examples of Table 11 have different monomer amounts, different peroxide amounts, different halide amounts, different solvent amounts, and different starting temperatures. These examples show that lignite is a critical reaction site for the initiation of polymerization and that this is a specialized and very powerful chemistry for grafting lignite.

Reactions conducted with hydrophobic monomers will not produce high yields of grafting unless the reaction is continuously stirred. Stirring rate is actually controlling "tip speed" of the stirring bar. "Tip speed" is the velocity of the ends of the stir bar or paddle in the reaction tank. This "tip speed" is a critical variable in mixing. Shear rate is approximately 12 times stirring rate in Hz. Shear stress is equal to viscosity times shear rate and shear stress is the fundamental value controlling the mechanochemistry of phase stability and mixing in the reaction. Thus, bar and reactor design will slightly alter the preferred stirring rate for a given reaction in a given reactor.

The grafted side chain or chains appear to occur at one or more of the aromatic ring positions on the molecules in lignite. Under the process conditions of the present invention already described, it is possible to obtain molecular weights of about 1,500 to 30,000,000. Under these conditions, the polymer molecular weight is generally increased by increasing the ratio of moles of monomer to moles of hydroperoxide. The converse is true when diminishing the molecular weight. However, by utilizing another aspect of the present invention, it has now been found possible to greatly boost or increase the molecular weight of the growing polymer during polymerization by conducting the reaction essentially in a gelled state.

Generally, the gelled state can be formed by essentially repeating the procedures already described for synthesizing the graft copolymer, but by reducing the amount of solvent, such as dimethylsulfoxide (DMSO), by a factor of 0.25 or more. In other words, instead of using about 40 g of solvent for the reaction as described in the Examples, about 28 or less g are used instead. It has been theorized that by conducting the polymerization reaction in the gelled state, the propagation reaction continues, while the termination reaction is greatly diminished. It is also possible that the higher concentration of backbone and repeat units allows crosslinking in these lower solvent content reactions. In general, the gelation occurs at room temperature with no heating being necessary. Reaction times are somewhat variable and on the order of from 1 to about 48 hours with reaction yields as high as 80 weight percent possible in about 1 hour.

Having now fully described the invented process, it will be apparent to one of ordinary skill in the art that many changes and modifications can be made thereto without departing from the spirit or scope of the invention as set forth herein.

I claim:

1. A water-insoluble, thermoplastic graft copolymer of lignite comprising a central lignite network and at least one grafted sidechain, each of the sidechains having at least one repeat unit, M', formed by polymerizing at least one hydrophobic ethene monomer, M, wherein the at least one ethene monomer, M, has a dipole moment of less than 1.2 or a water solubility of less than 5 g/100 g water at 30° C.

2. The graft copolymer of lignite according to claim 1 wherein substituents on the at least one monomer are selected from the group consisting of alkanes, alkenes, alkoxides, aromatics, cycloalkanes, esters, and halogens.

3. The graft copolymer of lignite according to claim 1 wherein the M' is represented by $(M')_m$ with the M' being (1-phenylethylene):

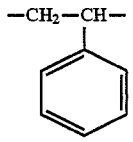

and m varies from 1 to 300,000.

4. The graft copolymer of lignite according to claim 1 wherein the M' is represented by $(M')_m$ with the M' being a polymerized 2-methyl-3-oxo-4-oxybut-1-ene-(p-ethoxy-(3*p+3)-ol):

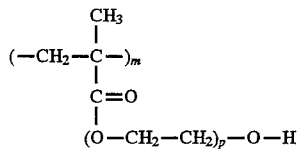

and the m varies from 1 to 300,000, the p varies from 0 to 300,000, and where the term (3*p+3) indicates the structural position number of the terminal hydroxyl group on the ethoxylated ester chain.

5. The graft copolymer of lignite according to claim 1 wherein the M' is represented by $(M')_m$ with the M' being 1-methyl-1-(1-oxo-2-oxypropyl)ethylene:

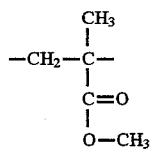

and the m varies from 1 to 300,000.

6. The graft copolymer of lignite according to claim 1 wherein the ethene monomer is selected from the group consisting of haloethenes where a haloethene is a monohalide- to tetrahalide-substituted ethene with the halide being fluorine, chlorine, or bromine; 1-phenylethene; 1-methyl-1-phenylethene; 1-(n-halophenyl)ethene where n is 2, 3, or 4 and the halide substituent is fluorine, chlorine, or bromine; 1,n-diethenylbenzene, where n=2, 3, or 4; 1,3-butadiene; 2-methyl-1,3-butadiene; 1-methyl-1-phenylethene; 2-chloro-1,3-butadiene; 2-oxo-3-oxypent-4-ene; a 2-methyl-3-oxo-4-oxybut-1-ene-(p-ethoxy-(3*p+3)-ol) and p varies from 0 to 300,000; 2-oxy-3-oxopent-4-ene; 4-methyl-2-oxy-3-oxopent-4-ene; propene; and ethene.

7. The graft copolymer of lignite according to claim 1 wherein the units M' consist of first and second randomly repeating units, $(M_1')_m$ and $(M_2')_n$, wherein the $(M_1')_m$ is any one selected from the group consisting of 1-phenylethylene, 1-methyl-1-(1-oxo-2-oxypropyl)ethylene, and polymerized 2-methyl-3-oxo-4-oxybut-1-ene-(p-ethoxy-(3*p+3)-ol); and the $(M_2')_n$ is any other one of the group; the amount of $(M_1')$ repeat units varies from 0.01 to 99.99 mole percent and the amount of $(M_2')$ repeat units varies from 0.01 to 99.99 mole percent; the central lignite network has a number-average molecular weight of about 1,000 to 1,500,000; the total number of randomly repeating units, m plus n, in the grafted side chain or chains is in the range of 1 to 300,000 units and the value of p ranges from 0 to 300,000; and the total graft copolymer, number-average molecular weight is in the range of 1,500 to 30,000,000.

8. The water-insoluble, graft copolymer of lignite according to claim 1, wherein the M consists of first and second ethene monomers, $M_1$ and $M_2$, and the $M_1$ has substituents selected from the group consisting of alkanes, alkenes, alkoxides, aromatics, cycloalkanes, esters, and halogens; and the ethene monomer, $M_2$, is an alkenearomatic.

9. The graft copolymer of lignite according to claim 8 wherein the $M_1$ is selected from the group consisting of haloethenes where a haloethene is a monohalide- to tetrahalide-substituted ethene with the halide being fluorine, chlorine, or bromine; 1-phenylethene; 1-methyl-1-phenylethene; 1-(n-halophenyl)ethene where n is 2, 3, or 4 and the halide substituent is fluorine, chlorine, or bromine; 1,n-diethenylbenzene, where n=2, 3, or 4; 1,3-butadiene; 2-methyl-1,3-butadiene; 1-methyl-1-phenylethene; 2-chloro-1,3-butadiene; 2-oxo-3-oxypent-4-ene; a 2-methyl-3-oxo-4-oxybut-1-ene-(p-ethoxy-(3*p+3)-ol) and p varies from 0 to 300,000; 2-oxy-3-oxopent-4-ene; 4-methyl-2-oxy-3-oxopent-4-ene; propene; and ethene.

10. The water-insoluble, graft copolymer of lignite according to claim 1, wherein the M consists of first and second ethene monomers, $M_1$ and $M_2$, and the $M_1$ has substituents selected from the group consisting of alkanes, alkenes, alkoxides, aromatics, cycloalkanes, esters, and halogens; and the ethene monomer, $M_2$, is 1-phenylethene.

11. The graft copolymer of lignite according to claim 10 wherein the $M_1$ is selected from the group consisting of haloethenes where a haloethene is a monohalide- to tetrahalide-substituted ethene with the halide being fluorine, chlorine, or bromine; 1-phenylethene; 1-methyl-1-phenylethene; 1-(n-halophenyl)ethene where n is 2, 3, or 4 and the halide substituent is fluorine, chlorine, or bromine; 1,n-diethenylbenzene, where n=2, 3, or 4; 1,3-butadiene; 2-methyl-1,3-butadiene; 1-methyl-1-phenylethene; 2-chloro-1,3-butadiene; 2-oxo-3-oxypent-4-ene; a 2-methyl-3-oxo-4-oxybut-1-ene-(p-ethoxy-(3*p+3)-ol) and p varies from 0 to 300,000; 2-oxy-3-oxopent-4-ene; 4-methyl-2-oxy-3-oxopent-4-ene; propene; and ethene.

12. The water-insoluble, graft copolymer of lignite according to claim 1, wherein the M consists of first and second ethene monomers, $M_1$ and $M_2$, and the $M_1$ has substituents selected from the group of alkanes, alkenes, alkoxides, aromatics, cycloalkanes, esters, and halogens; and the ethene monomer, $M_2$, is an alkene ether.

13. The graft copolymer of lignite according to claim 12 wherein the $M_1$ is selected from the group consisting of haloethenes where a haloethene is a monohalide- to tetrahalide-substituted ethene with the halide being fluorine, chlorine, or bromine; 1-phenylethene; 1-methyl-1-phenylethene; 1-(n-halophenyl)ethene where n is 2, 3, or 4 and the halide substituent is fluorine, chlorine, or bromine; 1,n-diethenylbenzene, where n=2, 3, or 4; 1,3-butadiene; 2-methyl-1,3-butadiene; 1-methyl-1-phenylethene; 2-chloro-1,3-butadiene; 2-oxo-3-oxypent-4-ene; a 2-methyl-3-oxo-4-oxybut-1-ene-(p-ethoxy-(3*p+3)-ol) and p varies from 0 to 300,000; 2-oxy-3-oxopent-4-ene; 4-methyl-2-oxy-3-oxopent-4-ene; propene; and ethene.

14. The water-insoluble, graft copolymer of lignite according to claim 1, wherein the M consists of first and second ethene monomers, $M_1$ and $M_2$, and the $M_1$ has substituents selected from the group of alkanes, alkenes, alkoxides, aromatics, cycloalkanes, esters, and halogens; and the ethene monomer, $M_2$, is a 2-methyl-3-oxo-4-oxybut-1-ene-(p-ethoxy-(3*p+3)-ol) where the term (3*p+3) indicates the structural position number of the terminal hydroxyl group on the ethoxylated ester chain, and p varies from 0 to 300,000.

15. The graft copolymer of lignite according to claim 14 wherein the $M_1$ is selected from the group consisting of haloethenes where a haloethene is a monohalide- to tetrahalide-substituted ethene with the halide being fluorine, chlorine, or bromine; 1-phenylethene; 1-methyl-1-phenylethene; 1-(n-halophenyl)ethene where n is 2, 3, or 4 and the halide substituent is fluorine, chlorine, or bromine; 1,n-diethenylbenzene, where n=2, 3, or 4; 1,3-butadiene; 2-methyl-1,3-butadiene; 1-methyl-1-phenylethene; 2-chloro-1,3-butadiene; 2-oxo-3-oxypent-4-ene; a 2-methyl-3-oxo-4-oxybut-1-ene-(p-ethoxy-(3*p+3)-ol) and p varies from 0 to 300,000; 2-oxy-3-oxopent-4-ene; 4-methyl-2-oxy-3-oxopent-4-ene; propene; and ethene.

16. The water-insoluble, graft copolymer of lignite according to claim 1, wherein the M consists of first and second ethene monomers, $M_1$ and $M_2$, and the $M_1$ has substituents selected from the group consisting of alkanes, alkenes, alkoxides, aromatics, cycloalkanes, esters, and halogens; and the ethene monomer, $M_2$, is an acrylate.

17. The graft copolymer of lignite according to claim 16 wherein the $M_1$ is selected from the group consisting of haloethenes where a haloethene is a monohalide- to tetrahalide-substituted ethene with the halide being fluorine, chlorine, or bromine; 1-phenylethene; 1-methyl-1-phenylethene; 1-(n-halophenyl)ethene where n is 2, 3, or 4 and the halide substituent is fluorine, chlorine, or bromine; 1,n-diethenylbenzene, where n=2, 3, or 4; 1,3-butadiene; 2-methyl-1,3-butadiene; 1-methyl-1-phenylethene; 2-chloro-1,3-butadiene; 2-oxo-3-oxypent-4-ene; a 2-methyl-3-oxo-4-oxybut-1-ene-(p-ethoxy-(3*p+3)-ol) and p varies from 0 to 300,000; 2-oxy-3-oxopent-4-ene; 4-methyl-2-oxy-3-oxopent-4-ene; propene; and ethene.

18. The water-insoluble, graft copolymer of lignite according to claim 1, wherein the M consists of first and second ethene monomers, $M_1$ and $M_2$, and the $M_1$ has substituents selected from the group consisting of alkanes, alkenes, alkoxides, aromatics, cycloalkanes, esters, and halogens; and the ethene monomer, $M_2$, is 4-methyl-2-oxy-3-oxopent-4-ene.

19. The graft copolymer of lignite according to claim 18 wherein the $M_1$ is selected from the group consisting of haloethenes where a haloethene is a monohalide- to tetrahalide-substituted ethene with the halide being fluorine, chlorine, or bromine; 1-phenylethene; 1-methyl-1-phenylethene; 1-(n-halophenyl)ethene where n is 2, 3, or 4 and the halide substituent is fluorine, chlorine, or bromine; 1,n-diethenylbenzene, where n=2, 3, or 4; 1,3-butadiene; 2-methyl-1,3-butadiene; 1-methyl-1-phenylethene; 2-chloro-1,3-butadiene; 2-oxo-3-oxypent-4-ene; a 2-methyl-3-oxo-4-oxybut-1-ene-(p-ethoxy-(3*p+3)-ol) and p varies from 0 to 300,000; 2-oxy-3-oxopent-4-ene; 4-methyl-2-oxy-3-oxopent-4-ene; propene; and ethene.

20. The water-insoluble, graft copolymer of lignite according to claim 1, wherein said lignite is at least one of peat, soft brown lignite, dull brown lignite, bright brown lignite, or coal.

21. An article of manufacture comprising said graft copolymer of lignite as set forth in claim 1.

22. An article of manufacture comprising water-insoluble, thermoplastic, grafted particles of lignite, said lignite having at least 2 alkylaromatic molecules and at least one grafted sidechain, said sidechain having at least one repeat unit, M', formed by polymerizing at least one hydrophobic ethene monomer, M, wherein the at least one ethene monomer has a dipole moment of less than 1.2 or a water solubility of less than 5 g/100 g water at 30° C. and the at least one ethene monomer, M, is polymerized by free radical polymerization wherein the substituents on the monomer or monomers are selected from the group consisting of alkanes, alkenes, alkoxides, aromatics, cycloalkanes, esters, and halogens.

23. A method for preparing a water-insoluble, thermoplastic, graft copolymer of lignite, said lignite being at least one of peat, soft brown lignite, dull brown lignite, bright brown lignite, or coal, by free radically graft copolymerizing on lignite at least one hydrophobic ethene monomer having a dipole moment of less than 1.2 or a water solubility of less than 5 g/100 g water at 30° C., wherein said copolymerizing comprises:

a) adding lignite to a solvent to thereby form a mixture; and then b) adding a halide salt; a peroxide; and the monomer.

24. The method according to claim 23, wherein the peroxide consists essentially of at least one selected from the group consisting of hydroperoxides and solid peroxides.

25. The method according to claim 23, further including before step (a), crushing lignite to a numerical mesh value of between 1 and 1,000.

26. The method according to claim 23, wherein the mixture of steps a) and b) is stirred continuously.

27. The method according to claim 23, wherein the reaction mixture is maintained at about room temperature.

28. The method according to claim 23, wherein the mixture is stirred continuously and maintained at about room temperature.

29. The method according to claim 23, wherein the copolymerization is conducted under a blanket of gaseous monomer.

30. The method according to claim 23, wherein the monomers are in a gaseous state and are added by bubbling into the reaction mixture.

31. The method according to claim 23, wherein said step of copolymerizing is conducted under an inert atmosphere consisting of at least one of nitrogen, carbon dioxide, argon, helium, krypton, or xenon.

32. The method according to claim 23, wherein copolymerizing is terminated by exposure to oxygen.

33. A method according to claim 23, wherein said copolymerizing comprises: before step a), crushing lignite to a numerical mesh value of between 1 and 1,000; step b) is conducted by adding the crushed lignite to the solvent, said solvent is selected from the group consisting of dimethyl sulfoxide (DMSO), dimethyl acetamide (DMAc), dimethyl formamide (DMF), 1,4-dioxane, 1-methyl-2-pyrrolidianone, pyridine, and a mixture of water and an organic solvent selected from the group consisting of dimethyl sulfoxide, dimethyl acetamide, dimethyl formamide, 1,4-dioxane, 1-methyl-2-pyrrolidianone, and pyridine; adding the halide salt, wherein said halide salt selected from the group consisting of calcium, magnesium, sodium, potassium, ammonium, and lithium chloride; calcium, magnesium, sodium, potassium, ammonium, and lithium bromide; and calcium, magnesium, sodium, potassium, ammonium, and lithium fluoride; adding said peroxide which is at least one of a hydroperoxide or a solid peroxide, wherein said hydroperoxide is selected from the group consisting of hydrogen peroxide, 2-hydroperoxy-1,4-dioxycyclohexane, 3,3-dimethyl-1,2-dioxybutane, and the anhydrous solid peroxides: sodium peroxyborate, magnesium peroxyphthalate, and sodium percarbonate; the halide salt concentration of the reaction mixture ranges from about 0.1 weight percent to about 4.0 weight percent, the halide ion concentration of the reaction mixture ranges from about 0.04 weight percent to about 2.5 weight percent, and the hydroperoxide to halide ion mole ratio of the reaction mixture ranges from about 0.17 to about 2.30; adding said monomer which is at least one selected from the group consisting of a haloethene where a haloethene is a monohalide- to tetrahalide-substituted ethene with the halide being fluorine, chlorine, or bromine; 1-phenylethene; 1-methyl-1-phenylethene; 1-(n-halophenyl)ethene where n is 2, 3, or 4 and the halide substituent is fluorine, chlorine, or bromine; 1,n-diethenylbenzene, where n=2, 3, or 4; 1,3-butadiene; 2-methyl-1,3-butadiene; 1-methyl-1-phenylethene; 2-chloro-1,3-butadiene; 2-oxo-3-oxypent-4-ene; a 2-methyl-3-oxo-4-oxybut-1-ene-(p-ethoxy-(3*p+3)-ol) and p varies from 0 to 300,000; 2-oxy-3-oxopent-4-ene; 4-methyl-2-oxy-3-oxopent-4-ene; propene; or ethene; thereby initiating free radical polymerization and allowing the reaction to proceed for about one hour to about 200 hours at a temperature of 0° to 40° C.; and then after step b), terminating the reaction by the addition of a free radical scavenger.

34. The method according to claim 33 wherein said copolymerization is terminated by allowing oxygen to enter the reaction chamber.

35. The method according to claim 33 wherein said reaction occurs at room temperature.

36. The method according to claim 33 wherein said copolymerizing comprises adding between 0.02 and 40.0 weight percent of the lignite; 0.01 and 40 weight percent of the monomer; 0.2 to 15.3 weight percent of the halide salt; and up to 98 weight percent of the solvent to the reaction.

37. The method according to claim 33 wherein said solvent is sufficient to conduct the reaction in a gelated state.

38. The method according to claim 23, wherein said copolymerizing comprises: before step a), crushing lignite to a numerical mesh value of between 1 and 1,000; step b) is conducted by adding the crushed lignite to the solvent, said solvent is selected from a group consisting of dimethyl sulfoxide (DMSO), dimethyl acetamide (DMAc), dimethyl formamide (DMF), 1,4-dioxane, 1-methyl-2-pyrrolidianone, pyridine, and a mixture of water and an organic solvent selected from the group consisting of dimethyl sulfoxide, dimethyl acetamide, dimethyl formamide, 1,4-dioxane, 1-methyl-2-pyrrolidianone, and pyridine; adding the halide salt, wherein said halide salt selected from the group consisting of calcium, magnesium, sodium, potassium, ammonium, and lithium chloride; calcium, magnesium, sodium, potassium, ammonium, and lithium bromide; and calcium, magnesium, sodium, potassium, ammonium, and lithium fluoride; adding said peroxide which is at least one of a hydroperoxide or a solid peroxide, wherein said hydroperoxide is selected from the group consisting of hydrogen peroxide, 2-hydroperoxy-1,4-dioxycyclohexane, 3,3-dimethyl-1,2-dioxybutane, and the anhydrous solid peroxides: sodium peroxyborate, magnesium peroxyphthalate, and sodium percarbonate; the halide salt concentration of the reaction mixture ranges from about 0.1 weight percent to about 4.0 weight percent, the halide ion concentration of the reaction mixture ranges from about 0.04 weight percent to about 2.5 weight percent, and the hydroperoxide to halide ion mole ratio of the reaction mixture ranges from about 0.17 to about 2.30; adding said monomer which is at least one selected from the group consisting of a haloethene where a haloethene is a monohalide- to tetrahalide-substituted ethene with the halide being fluorine, chlorine, or bromine; 1-phenylethene; 1-methyl-1-phenylethene; 1-(n-halophenyl)ethene where n is 2, 3, or 4 and the halide substituent is fluorine, chlorine, or bromine; 1,n-diethenylbenzene, where n=2, 3, or 4; 1,3-butadiene; 2-methyl-1,3-butadiene; 1-methyl-1-phenylethene; 2-chloro-1,3-butadiene; 2-oxo-3-oxypent-4-ene; a 2-methyl-3-oxo-4-oxybut-1-ene-(p-ethoxy-(3*p+3)-ol) and p varies from 0 to 300,000; 2-oxy-3-oxopent-4-ene; 4-methyl-2-oxy-3-oxopent-4-ene; propene; or ethene; continuously stirring the reaction vessel under an inert gas atmosphere at a rate between 0.1 and 100 Hertz; said inert atmosphere consisting of at least one of nitrogen, argon, carbon dioxide, helium, krypton, or xenon; thereby initiating free radical polymerization and allowing the reaction to proceed for about one hour to about 200 hours at a temperature of 0° to 40° C.; and then after step b), terminating the reaction by the addition of a free radical scavenger.

39. The method of claim 38, wherein said free radical polymerization is conducted with a mole ratio of halide ion to peroxide which is 0.10 or greater, a mole ratio of total peroxide to total lignite which is 0.50 or greater, and a mole ratio of total monomer to total lignite which is 1.0 or greater.

40. The method according to claim 23, wherein said copolymerizing comprises: before step a), crushing lignite to a numerical mesh value of between 1 and 1,000; step b) is conducted by adding the crushed lignite to the solvent, said solvent is selected from a group consisting of dimethyl sulfoxide (DMSO), dimethyl acetamide (DMAc), dimethyl formamide (DMF), 1,4-dioxane, 1-methyl-2-pyrrolidianone, pyridine, and a mixture of water and an organic solvent selected from the group consisting of dimethyl sulfoxide, dimethyl acetamide, dimethyl formamide, 1,4-dioxane, 1-methyl-2-pyrrolidianone, and pyridine; adding the halide salt, wherein said halide salt is selected from the group consisting of calcium, magnesium, sodium, potassium, ammonium, and lithium chloride; calcium, magnesium, sodium, potassium, ammonium, and lithium bromide; and calcium, magnesium, sodium, potassium, ammonium, and lithium fluoride; adding said peroxide which is at least one of a hydroperoxide or a solid peroxide, wherein said hydroperoxide is selected from the group consisting of hydrogen peroxide, 2-hydroperoxy-1,4-dioxycyclohexane, 3,3-dimethyl-1,2-dioxybutane, and the anhydrous solid peroxides: sodium peroxyborate, magnesium peroxyphthalate, and sodium percarbonate; the halide salt concentration of the reaction mixture ranges from about 0.1 weight percent to about 4.0 weight percent, the halide ion concentration of the reaction mixture ranges from about 0.04 weight percent to about 2.5 weight percent, the mole ratio of halide ion to peroxide is 0.10 or greater, and the mole ratio of total peroxide to total lignite is 0.50 or greater; adding a sufficient amount of said monomer which is at least one selected from the group consisting of a haloethene where a haloethene is a monohalide- to tetrahalide-substituted ethene with the halide being fluorine, chlorine, or bromine; 1-phenylethene; 1-methyl-1-phenylethene; 1-(n-halophenyl)ethene where n is 2, 3, or 4 and the halide substituent is fluorine, chlorine, or bromine; 1,n-diethenylbenzene, where n=2, 3, or 4; 1,3-butadiene; 2-methyl-1,3-butadiene; 1-methyl-1-phenylethene; 2-chloro-1,3-butadiene; 2-oxo-3-oxypent-4-ene; a 2-methyl-3-oxo-4-oxybut-1-ene-(p-ethoxy-(3*p+3)-ol) and p varies from 0 to 300,000; 2-oxy-3-oxopent-4-ene; 4-methyl-2-oxy-3-oxopent-4-ene; propene; or ethene such that the mole ratio of total monomer to total lignite is 1.0 or greater; thereby initiating free radical polymerization and allowing the reaction to proceed for about one hour to about 200 hours at a temperature of 0° to 40° C.; and then after step b), terminating the reaction by the addition of a free radical scavenger.

* * * * *